US011318810B2

(12) United States Patent
Bullock et al.

(10) Patent No.: US 11,318,810 B2
(45) Date of Patent: \*May 3, 2022

(54) HIGH FLOW RATE DUCTWORK FOR A RECREATIONAL VEHICLE

(71) Applicant: Thor Tech, Inc., Elkhart, IN (US)

(72) Inventors: Mark Bullock, Elkhart, IN (US); Jon Brock, Warsaw, IN (US); Bradd Giggy, LaGrange, IN (US); Jeff Snyder, White Pigeon, MI (US)

(73) Assignee: Thor Tech, Inc., Elkhart, IN (US)

( \* ) Notice: Subject to any disclaimer, the term of this patent is extended or adjusted under 35 U.S.C. 154(b) by 49 days.

This patent is subject to a terminal disclaimer.

(21) Appl. No.: 16/892,908

(22) Filed: Jun. 4, 2020

(65) Prior Publication Data

US 2020/0298656 A1 Sep. 24, 2020

Related U.S. Application Data

(63) Continuation of application No. 16/594,597, filed on Oct. 7, 2019, now Pat. No. 10,710,427.
(Continued)

(51) Int. Cl.
*B60H 1/00* (2006.01)
*B62D 25/06* (2006.01)
*B60P 3/32* (2006.01)

(52) U.S. Cl.
CPC ..... *B60H 1/00564* (2013.01); *B60H 1/00028* (2013.01); *B62D 25/06* (2013.01); *B60H 2001/00078* (2013.01); *B60P 3/32* (2013.01)

(58) Field of Classification Search
CPC ............ B60H 1/00564; B60H 1/00028; B60H 2001/00078; B60H 2001/00085; B62D 25/06; B60P 3/32
See application file for complete search history.

(56) References Cited

U.S. PATENT DOCUMENTS 4,477,099 A 10/1984 Luyckx
6,315,354 B1 11/2001 Tani et al.
(Continued)

FOREIGN PATENT DOCUMENTS

| EP | 700801 A1 | 3/1996 |
| EP | 1854681 A2 | 8/2006 |
| EP | 1870270 A1 | 12/2007 |

OTHER PUBLICATIONS

International Search Report and Written Opinion dated Dec. 18, 2019, for Application No. PCT/US2019/054963 filed Oct. 7, 2019.

*Primary Examiner* — Gregory A Blankenship
(74) *Attorney, Agent, or Firm* — Dinsmore & Shohl LLP

(57) ABSTRACT

Recreational vehicles are provided with a tapered duct connector and/or a conditioned air receiving sleeve that is positioned in an infra-ceiling space of the vehicle. The tapered duct connector comprises a connector inlet coupled to a conditioned air passage on a wall of the conditioned air receiving sleeve, and a connector outlet coupled to the supply duct, to fluidly couple the sleeve to the supply duct. The tapered duct connector comprises a transitional duct height that increases from the connector outlet to the connector inlet. The conditioned air passage of the conditioned air receiving sleeve, the tapered duct connector, and the supply duct is contained such that air can pass from the conditioned air opening of the conditioned air receiving sleeve, through the conditioned air receiving sleeve, and into the supply duct without contacting structural components in the infra-ceiling space of the recreational vehicle.

18 Claims, 31 Drawing Sheets

Related U.S. Application Data

(60) Provisional application No. 62/742,665, filed on Oct. 8, 2018.

(56) References Cited

U.S. PATENT DOCUMENTS

| | | | |
|---|---|---|---|
| 6,536,222 | B1 | 3/2003 | Ahn et al. |
| 6,779,834 | B1 | 8/2004 | Keller |
| 10,710,427 | B2 * | 7/2020 | Bullock ............. B60H 1/00564 |
| 2003/0176159 | A1 | 8/2003 | Nakagawa et al. |
| 2004/0140695 | A1 | 7/2004 | Garceau |
| 2007/0298702 | A1 | 12/2007 | Boxum |
| 2008/0233856 | A1 | 9/2008 | Okawa et al. |
| 2011/0127803 | A1 | 6/2011 | Ludwig et al. |
| 2012/0247718 | A1 | 10/2012 | Lawrence et al. |
| 2017/0038090 | A1 | 2/2017 | Bianchi et al. |
| 2020/0391571 | A1 * | 12/2020 | Henderson ......... B60H 1/00564 |
| 2021/0101443 | A1 * | 4/2021 | Snyder ................ B60H 1/3414 |
| 2021/0107332 | A1 * | 4/2021 | Mullen ............. B60H 1/00564 |

* cited by examiner

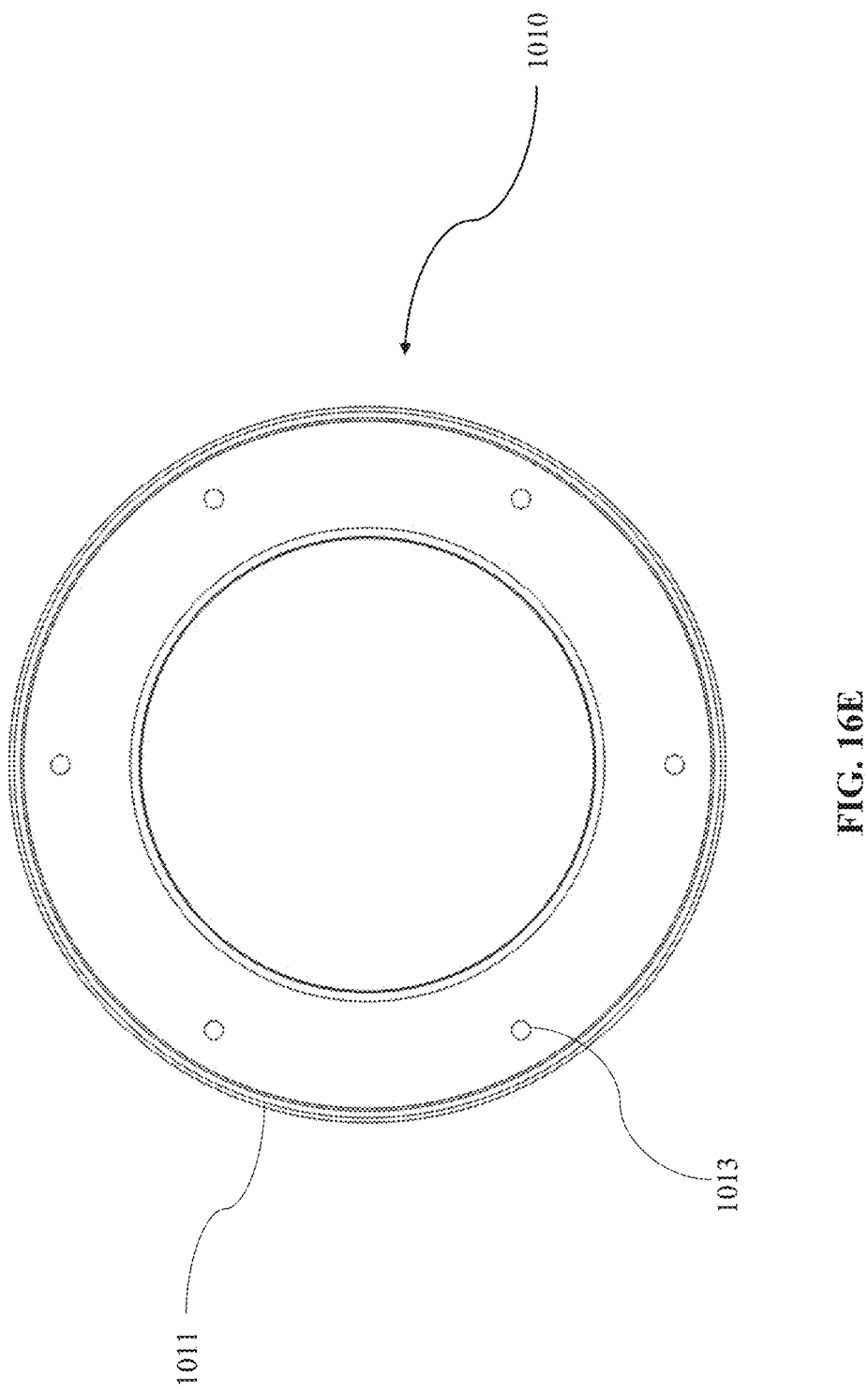

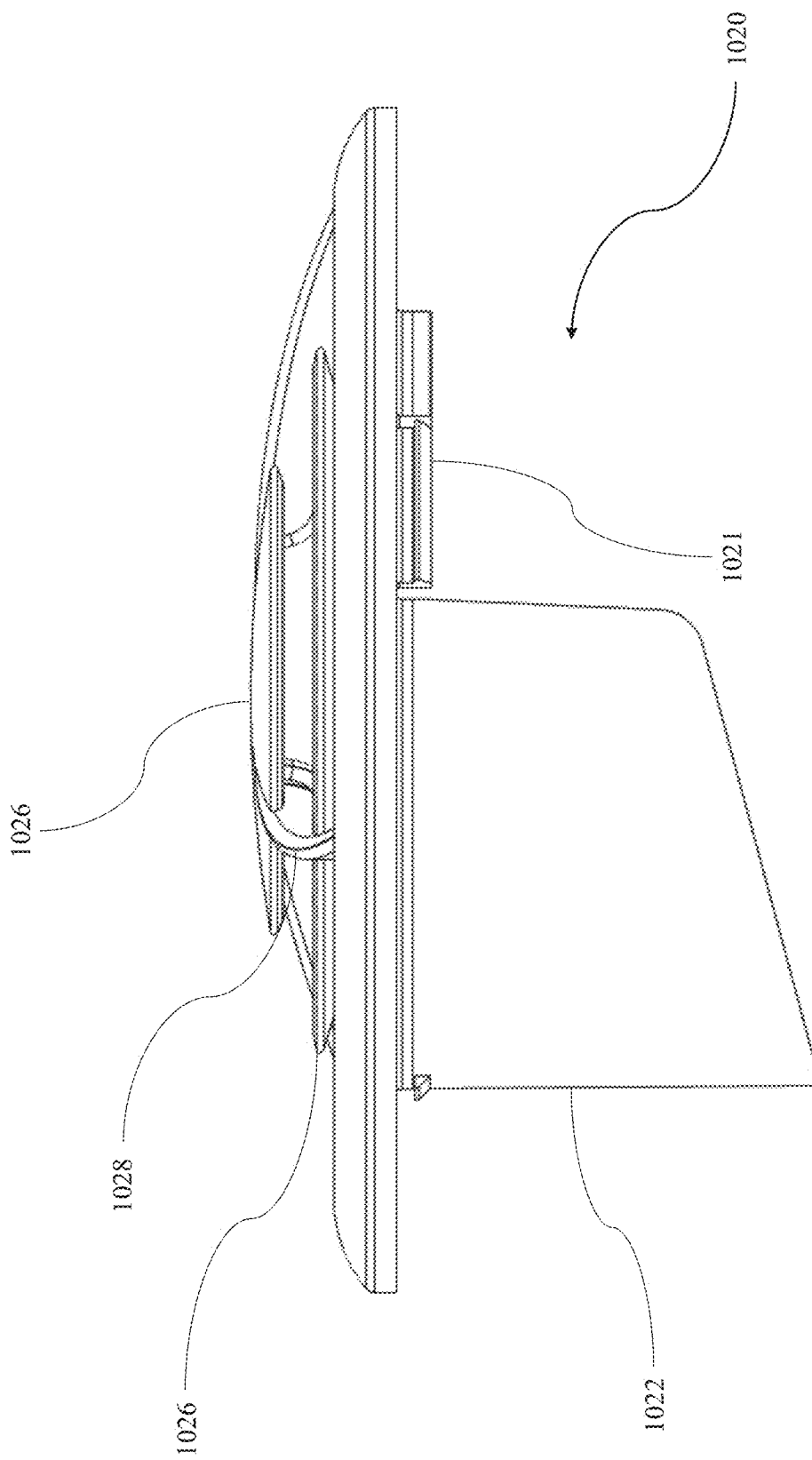

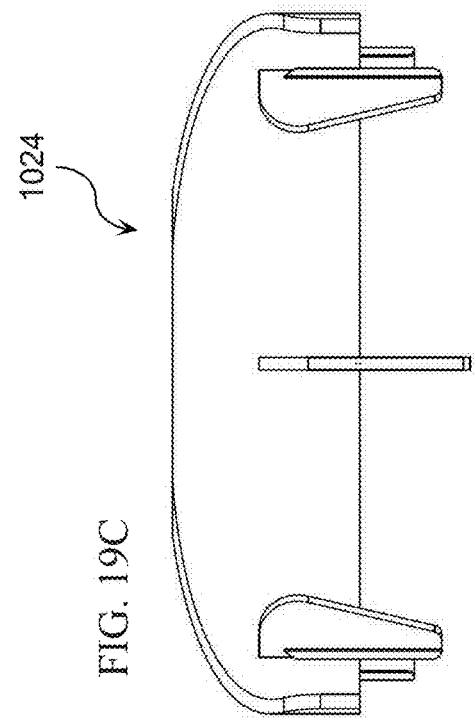
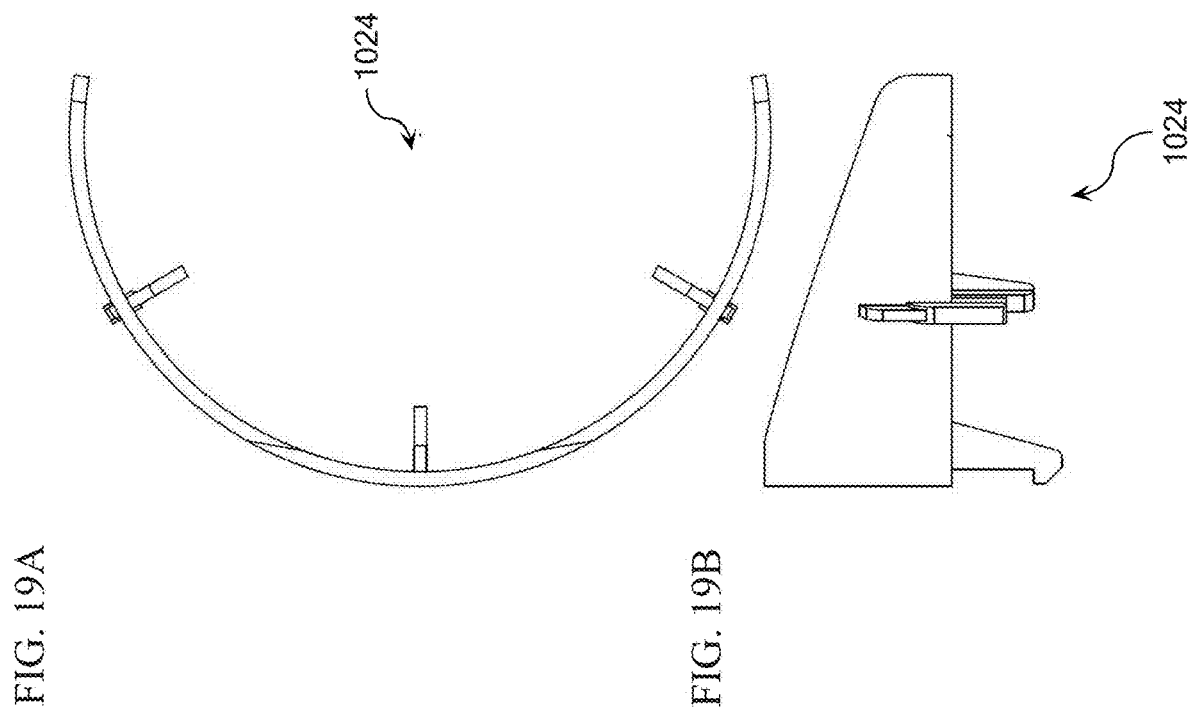
FIG. 19A  FIG. 19B  FIG. 19C

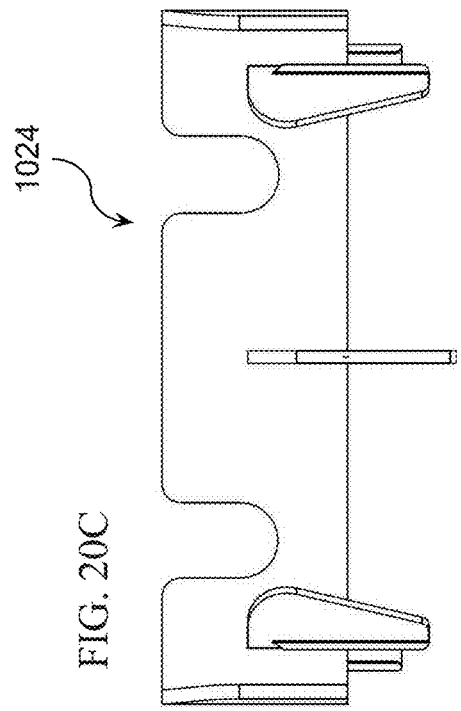
FIG. 20C
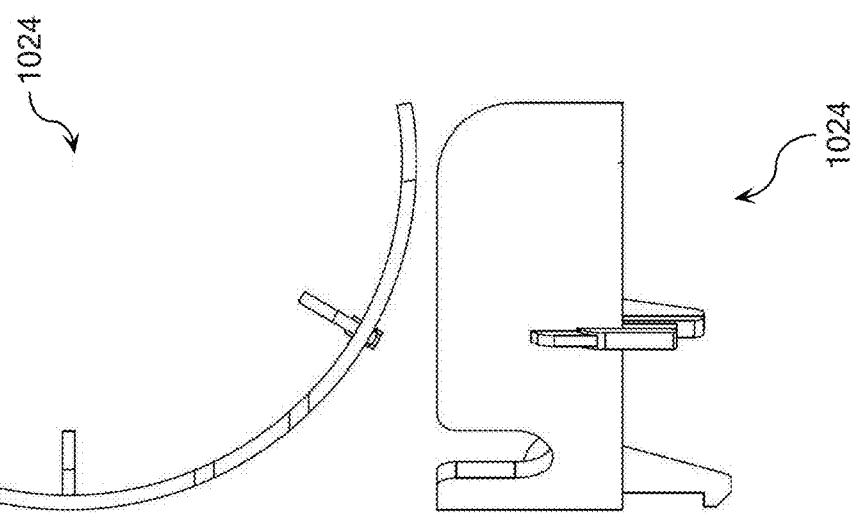
FIG. 20A
FIG. 20B

HIGH FLOW RATE DUCTWORK FOR A RECREATIONAL VEHICLE

CROSS-REFERENCE TO RELATED APPLICATIONS

This application is a continuation of U.S. patent application Ser. No. 16/594,597 filed Oct. 7, 2019, which claims the benefit of U.S. Provisional Application Ser. No. 62/742,665 filed Oct. 8, 2018.

BACKGROUND

The present disclosure relates to recreational vehicles, and more particularly, to heating, ventilation, and air conditioning (HVAC) ductwork and diffusing vent assemblies in recreational vehicles.

BRIEF SUMMARY

According to the subject matter of the present disclosure, high flowrate ductwork and HVAC vent assemblies are provided for recreational vehicles. Contemplated diffusing vent assemblies may include a diffuser base and a diffusing head that together create optimal distribution and circulation of air from an HVAC system within the interior of a recreational vehicle (RV).

The present inventors have recognized that RVs must endure high temperatures in the summer months and that improved air conditioning systems are desirable such that the air circulation inside the RV provided by an HVAC system enables occupants to stay at a comfortable temperature within the RV.

AC units are typically installed on the roof of an RV with the conditioned air outlet of the AC unit in direct communication with an AC air inlet of the RV ductwork, and the return air inlet of the AC unit in direct communication with a return air vent of the RV ductwork. In the embodiments illustrated herein, conditioned air flows from the AC unit, through the supply duct portion of the RV ductwork, into the interior of the RV. Return air flows into a return air portion of the RV ductwork back to the AC unit. The supply duct forms a network of channels for distributing the conditioned air into the interior of the RV.

Embodiments of the present disclosure provide an AC box sleeve, a sleeve insert, and tapered duct connectors for connection with an AC unit of a recreational vehicle. More particularly, these components can be positioned near the conditioned air outlet of the AC unit of the RV. The RV may be any conventional, or yet to be developed, RV such as a travel trailer, fifth wheel, destination trailer, or toy hauler. Although tapered elbow and tapered Y-shaped connectors are illustrated herein, the subject matter of the present disclosure also encompasses tapered linear connectors, which would not include structure to induce directional changes in air flow, as is the case with elbow connectors and Y-shaped connectors. The tapered design of these connectors optimizes mass air flow transfer from the AC unit to the supply ducts of the RV and increases the efficiency of the AC unit.

In accordance with one embodiment of the present disclosure, a recreational vehicle is provided comprising a supply duct assembly, the supply duct assembly comprising a conditioned air receiving sleeve, a tapered duct connector, and a supply duct. The conditioned air receiving sleeve is positioned in an infra-ceiling space of the recreational vehicle and further comprises a conditioned air opening occupying at least a majority of a top side of the conditioned air receiving sleeve, lateral sleeve walls defining a sleeve height $h_S$ that spans the infra-ceiling space of the recreational vehicle, a conditioned air passage occupying a lateral sleeve wall of the conditioned air receiving sleeve, and a return air opening occupying at least a majority of a bottom side of the conditioned air receiving sleeve. The tapered duct connector comprises a connector inlet coupled to the conditioned air passage on the lateral sleeve wall of the conditioned air receiving sleeve and a connector outlet coupled to the supply duct, to fluidly couple the conditioned air receiving sleeve to the supply duct. The tapered duct connector comprises a transitional duct height that increases from the connector outlet to the connector inlet. The conditioned air receiving sleeve, the tapered duct connector, and the supply duct contain a conditioned air passage therein such that conditioned air can pass from the conditioned air opening of the conditioned air receiving sleeve, through the conditioned air receiving sleeve, and into the supply duct without contacting structural components in the infra-ceiling space of the recreational vehicle.

The supply duct assembly may further comprise a sleeve insert, which in turn may comprise an insert portion that is sized to extend through the connector inlet and frictionally engage an inside periphery of the tapered duct connector. The sleeve insert may further comprise a flange portion that is sized to abut a framed portion of the conditioned air passage on the lateral sleeve wall of the conditioned air receiving sleeve to provide for securement of the sleeve insert to the conditioned air receiving sleeve along the framed portion of the conditioned air passage with the insert portion extending through the connector inlet of the tapered duct connector. The sleeve insert comprises an internal flow directing vane and/or an internal turning vane that extends from the flange portion of the sleeve insert and curves beyond the insert portion of the sleeve insert.

The conditioned air receiving sleeve may be presented as a six-sided rectangular cuboid where the conditioned air opening and the return air opening form opposite sides of the rectangular cuboid. Typically, these two opposing sides are completely open. Two opposing conditioned air passages may occupy opposing lateral sleeve walls of the conditioned air receiving sleeve. The recreational vehicle may comprise a longitudinal dimension extending parallel to the sides of the recreational vehicle and the two opposing conditioned air passages may face opposite sides of the recreational vehicle.

The tapered duct connector may comprise a transitional duct width that decreases from the connector outlet to the connector inlet as the transitional duct height increases from the connector outlet to the connector inlet. The respective magnitudes of decreasing transitional duct width and increasing transitional duct height may be such that the connector inlet comprises a cross-sectional flow area that is at least approximately 20% larger than a cross-sectional flow area of the connector outlet. The connector inlet may comprise a cross-sectional flow area that is between approximately 20% and approximately 40% larger than a cross-sectional flow area of the connector outlet, to optimize mass flow transfer from the conditioned air receiving sleeve to the supply duct without undue turbulence. The transitional duct height of the tapered duct connector may increase by a factor of at least about 1.25. An average slope representing a net increase in the transitional duct height of the connector from the connector outlet to the connector inlet may be between about 0.05 and about 0.10.

The tapered duct connector may be a linear connector, an elbow connector, or a Y-shaped connector. In contemplated embodiments, the tapered duct connector is a linear connector comprising a single connector inlet and a single connector outlet. In other embodiments, the tapered duct connector is an elbow connector comprising a single connector inlet and a single connector outlet, with the single connector inlet and a single connector outlet of the elbow connector directionally offset by between approximately 45 degrees and approximately 90 degrees, or at approximately 90 degrees. In still further embodiments, the tapered duct connector is a Y-shaped connector comprising a single connector inlet and two connector outlets directionally offset from the inlet by approximately 90 degrees.

The recreational vehicle may further comprise a roof-mounted AC unit and a ceiling-mounted return air assembly. The roof-mounted AC unit and the ceiling-mounted return air assembly may enclose opposite sides of the conditioned air receiving sleeve, with the roof-mounted AC unit over the conditioned air opening of the conditioned air receiving sleeve and the return air assembly over the return air opening of the conditioned air receiving sleeve.

In accordance with another embodiment of the present disclosure, a recreational vehicle is provided comprising a supply duct assembly, the supply duct assembly comprising a conditioned air receiving sleeve, a sleeve insert, a tapered duct connector, and a supply duct. The conditioned air receiving sleeve is positioned in an infra-ceiling space of the recreational vehicle. The conditioned air receiving sleeve further comprises a conditioned air opening occupying at least a majority of a top side of the conditioned air receiving sleeve, lateral sleeve walls defining a sleeve height $h_S$ that spans the infra-ceiling space of the recreational vehicle, a conditioned air passage occupying a lateral sleeve wall of the conditioned air receiving sleeve, and a return air opening occupying at least a majority of a bottom side of the conditioned air receiving sleeve. The tapered duct connector comprises a connector inlet coupled to the conditioned air passage on the lateral sleeve wall of the conditioned air receiving sleeve and a connector outlet coupled to the supply duct, to fluidly couple the conditioned air receiving sleeve to the supply duct. The sleeve insert comprises an insert portion sized to extend through the connector inlet and frictionally engage an inside periphery of the tapered duct connector. The sleeve insert further comprises a flange portion that is sized to abut a framed portion of the conditioned air passage on the lateral sleeve wall of the conditioned air receiving sleeve to provide for securement of the sleeve insert to the conditioned air receiving sleeve along the framed portion of the conditioned air passage with the insert portion extending through the connector inlet of the tapered duct connector. The tapered duct connector comprises a transitional duct height that increases by a factor of at least about 1.25 from the connector outlet to the connector inlet. The tapered duct connector comprises a transitional duct width that decreases from the connector outlet to the connector inlet as the transitional duct height increases from the connector outlet to the connector inlet. The respective magnitudes of decreasing transitional duct width and increasing transitional duct height are such that the connector inlet comprises a cross-sectional flow area that is at least approximately 20% larger than a cross-sectional flow area of the connector outlet. The conditioned air receiving sleeve, the sleeve insert, the tapered duct connector, and the supply duct contain a conditioned air passage therein such that conditioned air can pass from the conditioned air opening of the conditioned air receiving sleeve, through the conditioned air receiving sleeve, and into the supply duct without contacting structural components in the infra-ceiling space of the recreational vehicle.

In accordance with yet another embodiment of the present disclosure, a recreational vehicle is provided without the aforementioned conditioned air receiving sleeve. Specifically, a recreational vehicle may be provided comprising a supply duct assembly, the supply duct assembly comprising a sleeve insert, a tapered duct connector, and a supply duct. The tapered duct connector comprises a connector inlet and a connector outlet coupled to the supply duct. The sleeve insert comprises an insert portion sized to extend through the connector inlet and frictionally engage an inside periphery of the tapered duct connector. The sleeve insert further comprises a flange portion that is sized to abut a framed portion of a conditioned air passage to provide for securement of the sleeve insert with the insert portion extending through the connector inlet of the tapered duct connector. The tapered duct connector comprises a transitional duct height that increases by a factor of at least about 1.25 from the connector outlet to the connector inlet. The tapered duct connector comprises a transitional duct width that decreases from the connector outlet to the connector inlet as the transitional duct height increases from the connector outlet to the connector inlet. The respective magnitudes of decreasing transitional duct width and increasing transitional duct height are such that the connector inlet comprises a cross-sectional flow area that is at least approximately 20% larger than a cross-sectional flow area of the connector outlet.

Although the concepts of the present disclosure are described herein with primary reference to ductwork of a particular geometry, it is contemplated that the concepts will enjoy applicability to any of a variety of ductwork and RV configurations.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIGS. 16A-16F illustrate a diffuser base of a diffusing vent assembly according to one embodiment of the present disclosure, from a variety of perspectives;

FIGS. 17A-17E illustrate a diffusing head of a diffusing vent assembly according to one embodiment of the present disclosure, from a variety of perspectives; and FIGS. 18A-C, 19A-C, 20A-C, and 21A-C illustrate a variety of separate extended air blade portions of contemplated diffusing assemblies according to the present disclosure.

DETAILED DESCRIPTION

Figure 1:
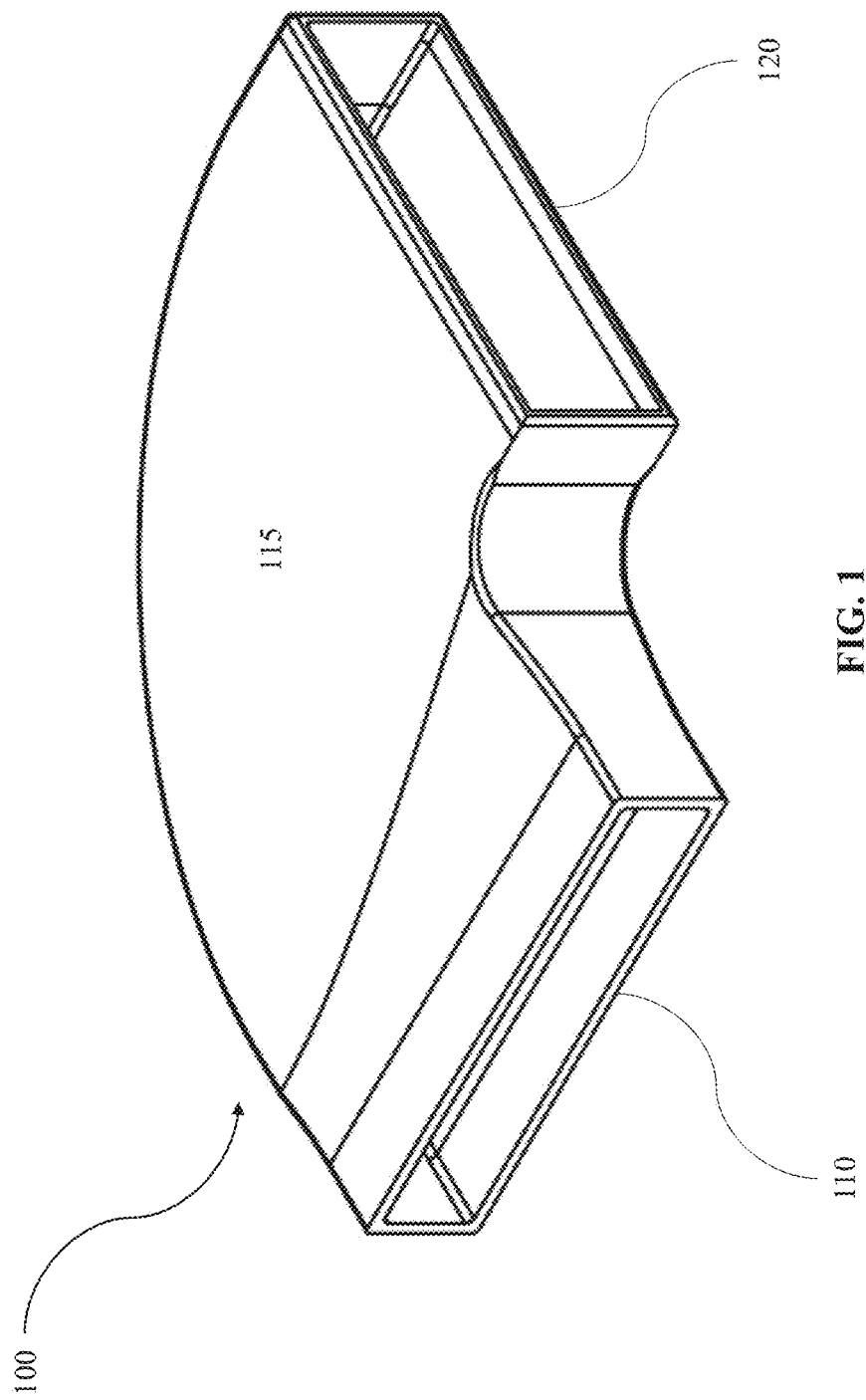
FIG. 1 illustrates a tapered duct connector in the form of an elbow connector according to one embodiment of the present disclosure.

FIG. 1 shows a tapered elbow connector 100 for connecting a supply duct of an RV supply duct assembly to a conditioned air receiving sleeve, hereinafter referred to as an "AC box sleeve," of the RV supply duct assembly. The tapered elbow connector 100 has a connector outlet 110 of cross-sectional area A, a connector inlet 120 of cross-sectional area B, and a curved connecting portion 115 that may be sloped on the upper and/or lower surfaces of the tapered elbow connector 100. As a result of this slope, the cross-sectional area B of the inlet 120 can be made to be greater than the cross-sectional area A of the outlet 110. As will be described in greater detail below with reference to FIGS. 6-8 and 10, this tapered duct design takes advantage of increased duct headspace in the vicinity of the AC unit where the roof cavity of the RV is typically at its maximum height, which maximizes duct volume at the inlet 120 and therefore optimizes the flow of cooled air from the AC unit to the interior of the RV. In addition, a conditioned air receiving sleeve, which is also described in detail below, may be provided in this area of increased headspace in fluid communication with the tapered elbow connector 100, and may have a sleeve height $h_S$ that is at least 1.5 times larger than the supply duct height $h_D$. The smooth curvature and taper of the curved connecting portion 115 also enables the air entering the inlet 120 to be redirected towards the outlet 110 with minimal flow rate loss, further enhancing airflow into the living space of the RV.

Figure 2:
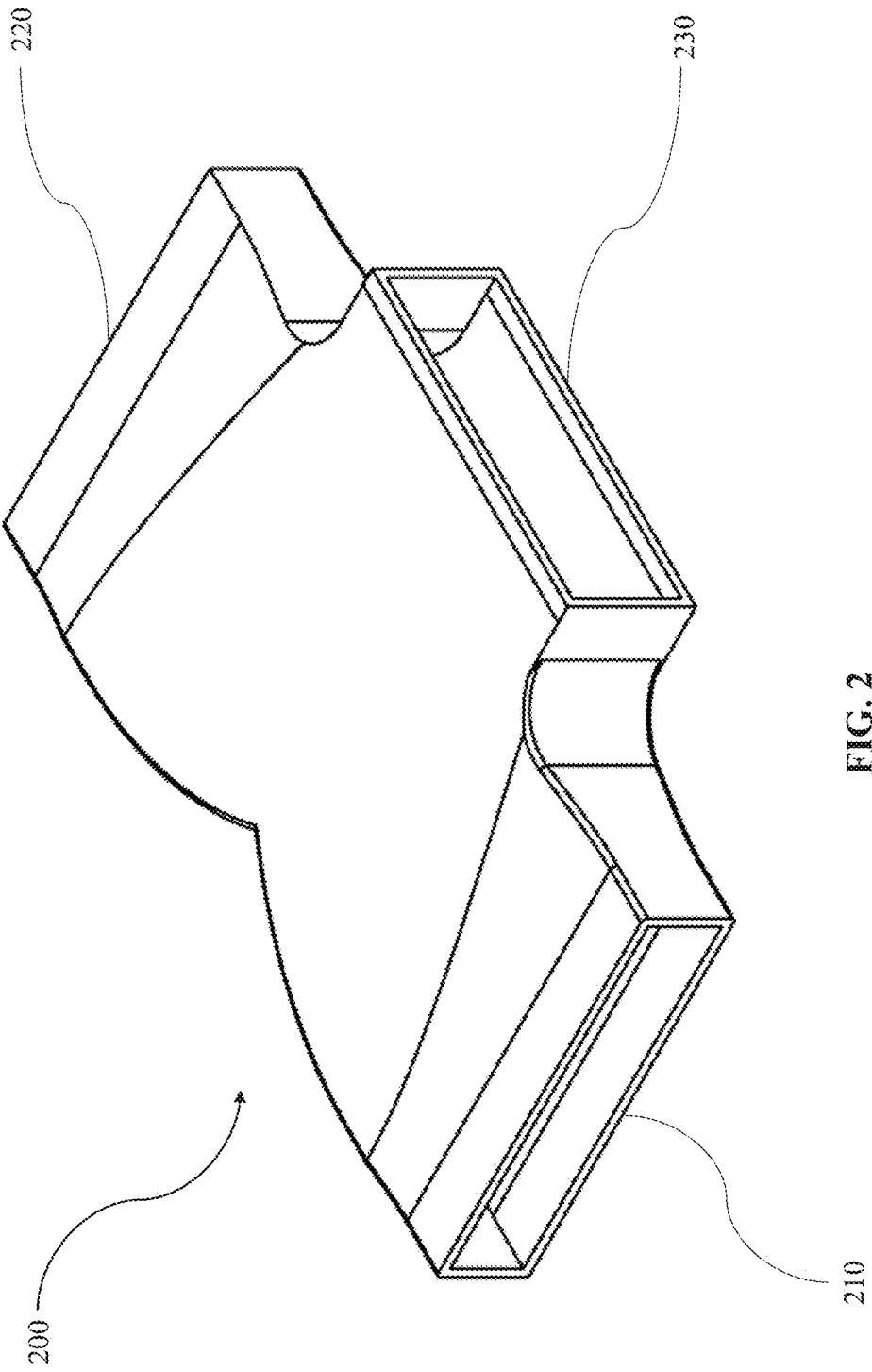
FIG. 2 illustrates a tapered duct connector in the form of a tapered Y-shaped connector according to one embodiment of the present disclosure.

FIG. 2 shows a tapered Y-shaped connector 200 connecting the supply duct assembly to the AC box sleeve. The Y-shaped connector 200 has two outlets 210 and 220 and an inlet 230. As is the case with the tapered elbow connector of FIG. 1, the inlet 230 is also designed to take advantage of increased duct headspace in the vicinity of the AC unit where the roof cavity of the RV is typically at it maximum height. The tapered elbow connector and the tapered Y-shaped connector can be manufactured using materials commonly used in making AC supply ducts such as, for example, foil backed foam board or other types of insulated duct foam.

In addition to the tapered elbow connector 100 and the Y-shaped connector 200, a duct joiner may be additionally incorporated in a supply duct assembly of an RV. Suitable duct joiners can be configured to connect two lengths of supply duct, end-to-end, to connect a tapered elbow connector to a length of supply duct, or to connect a tapered Y-shaped connector to a length of supply duct. The geometry of the duct joiner may be similar to that of the duct plug 50 illustrated below, with reference to FIGS. 9A and 9B, with the exception that the duct joiner will comprise two duct insert portions 52 on opposite sides of the flange 54, and that the flange of the duct joiner would be open to permit the passage of air from one duct component to the next.

Figure 3:
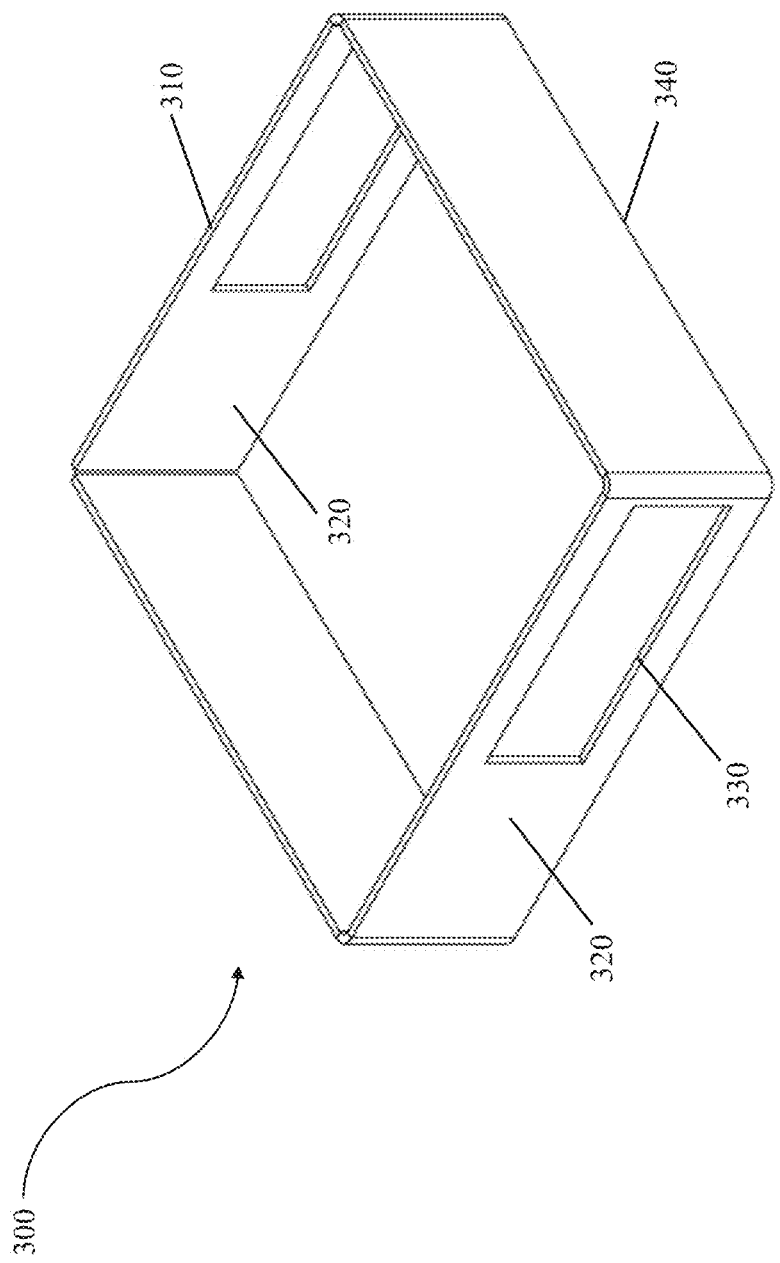
FIG. 3 illustrates an AC box sleeve according to one embodiment of the present disclosure.

FIG. 3 illustrates a conditioned air receiving sleeve 300, or "AC box sleeve," that may be incorporated in RV supply duct assemblies according to the present disclosure. The conditioned air receiving sleeve 300 further comprises a conditioned air opening occupying at least a majority of a top side 310 of the conditioned air receiving sleeve 300, lateral sleeve walls 320 defining a sleeve height $h_S$ that is chosen to span the infra-ceiling space of a recreational vehicle, conditioned air passages 330 occupying the lateral sleeve walls 320, and a return air opening occupying at least a majority of a bottom side 340 of the conditioned air receiving sleeve 300. In the illustrated embodiment, conditioned air passages 330 are provided on two of the lateral sleeve walls 320 but it is contemplated that the present disclosure also contemplates embodiments where only one conditioned air passage 330 is provided. The illustrated conditioned air receiving sleeve 300 comprises a six-sided rectangular cuboid where the conditioned air opening and the return air opening form opposite sides of the rectangular cuboid and two opposing conditioned air passages 330 occupy the opposing lateral sleeve walls 320.

Figure 6:
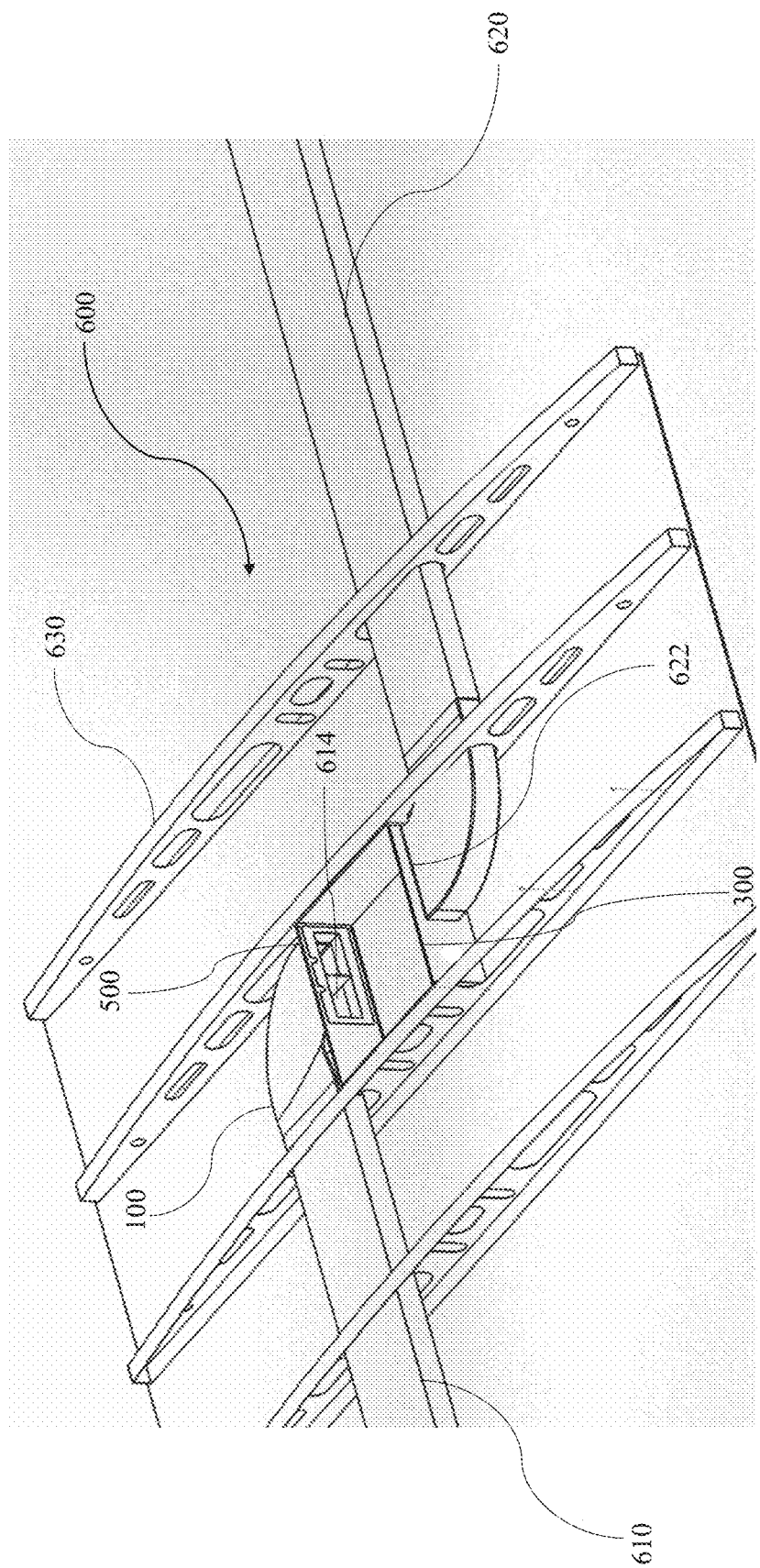
FIG. 6 illustrates a supply duct assembly according to one embodiment of the present disclosure.
Figure 7:
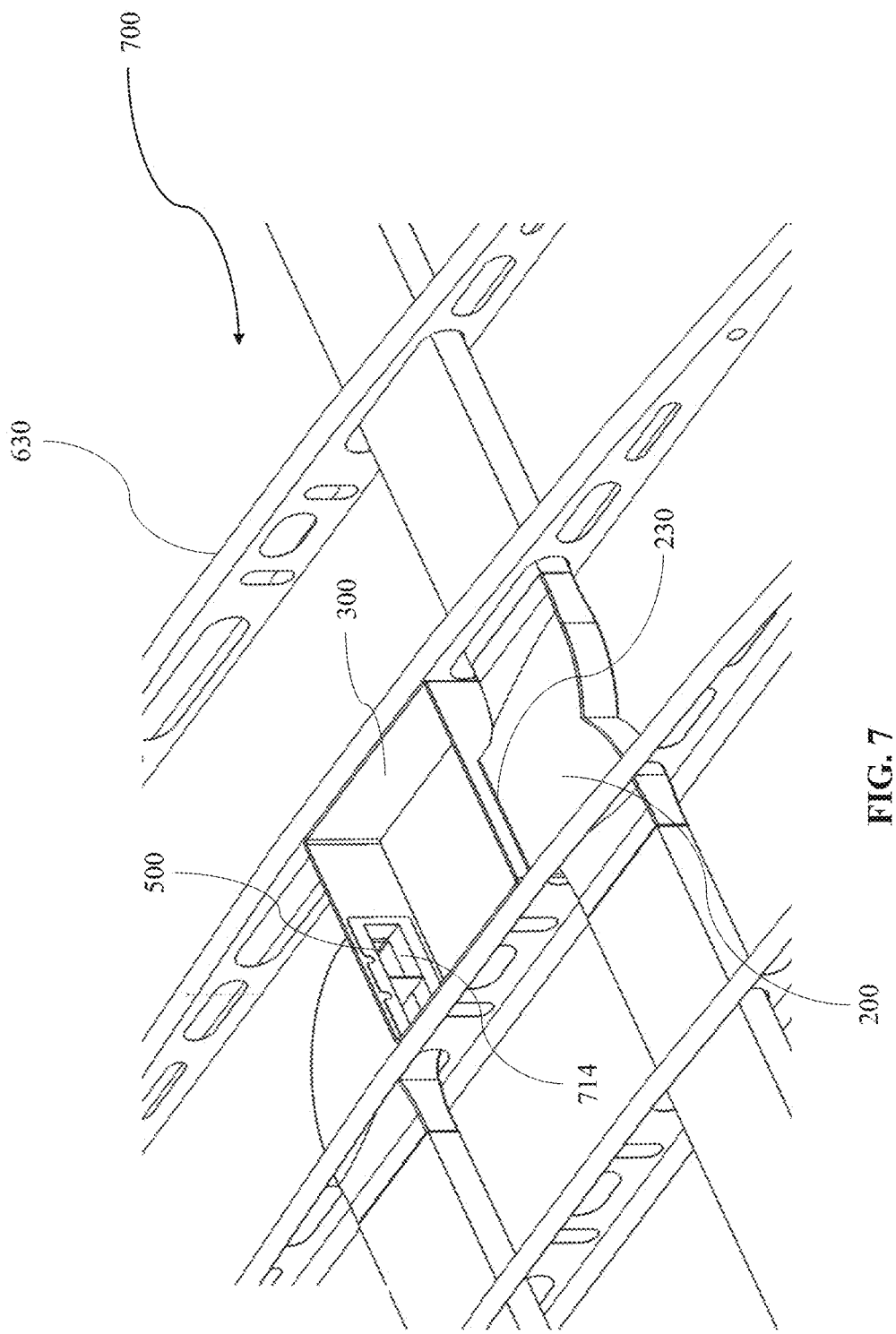
FIGS. 7 and 8 illustrate alternative supply duct assemblies according to the present disclosure.

Referring further to FIGS. 6 and 7, an AC box sleeve 300 may be used in a supply duct assembly in conjunction with a sleeve insert 500 and the tapered elbow connector 100 or the tapered Y-shaped connector 200 to optimize air flow from the conditioned air outlet of an AC unit of an RV, through the supply duct assembly 600, 700 of the RV, and into the interior of the RV. More specifically, referring to the supply duct assemblies 600, 700 illustrated in FIGS. 6 and 7, the present inventors have recognized that RV duct work installations often contain surface irregularities and structural features that might not be optimal for efficient air flow. The AC box sleeve 300 can be used to cover cracks, crevices, and other surface irregularities, and to keep conditioned air out of contact with structural features that might obstruct air flow or introduce heat into the cool air stream, thus providing thermally efficient, continuous, and relatively smooth surfaces for the transfer of conditioned air. Although a variety of materials will be suitable for constructing the AC box sleeve, it is contemplated that the AC box sleeve 300 may be made of insulated duct foam for optimal cooling efficiency and mass air flow transfer.

Figure 4A:
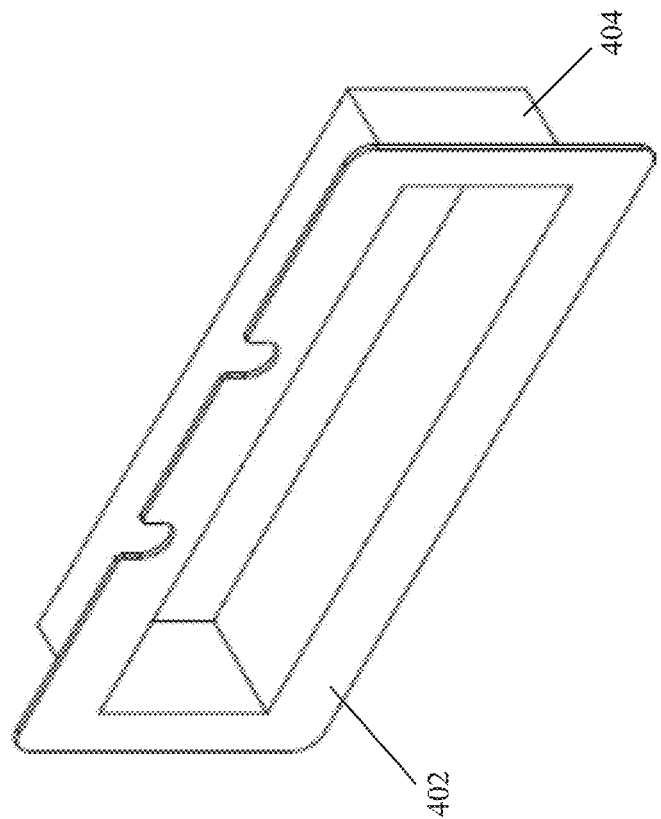
FIGS. 4A and 4B illustrate alternative sleeve inserts according to the present disclosure.
Figure 4B:
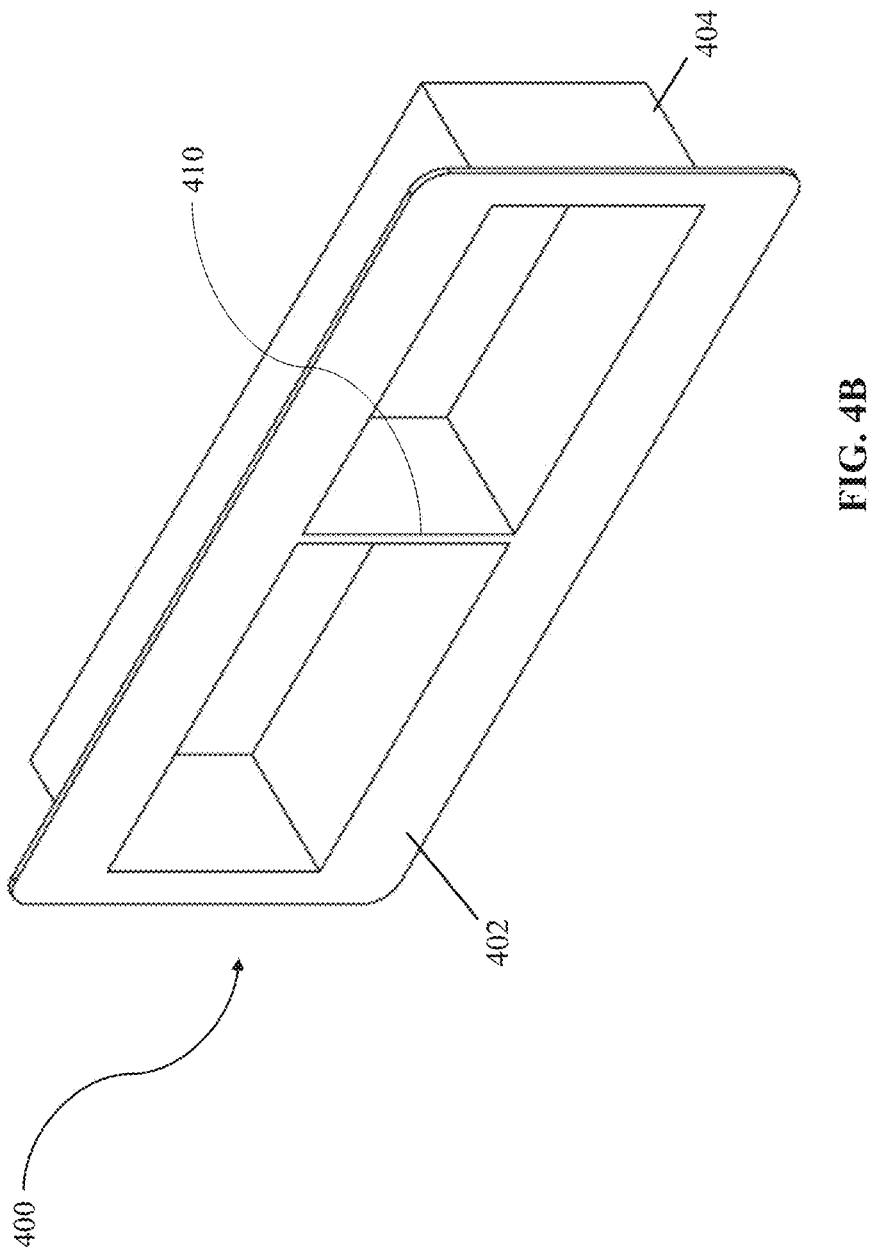
Figure 5:
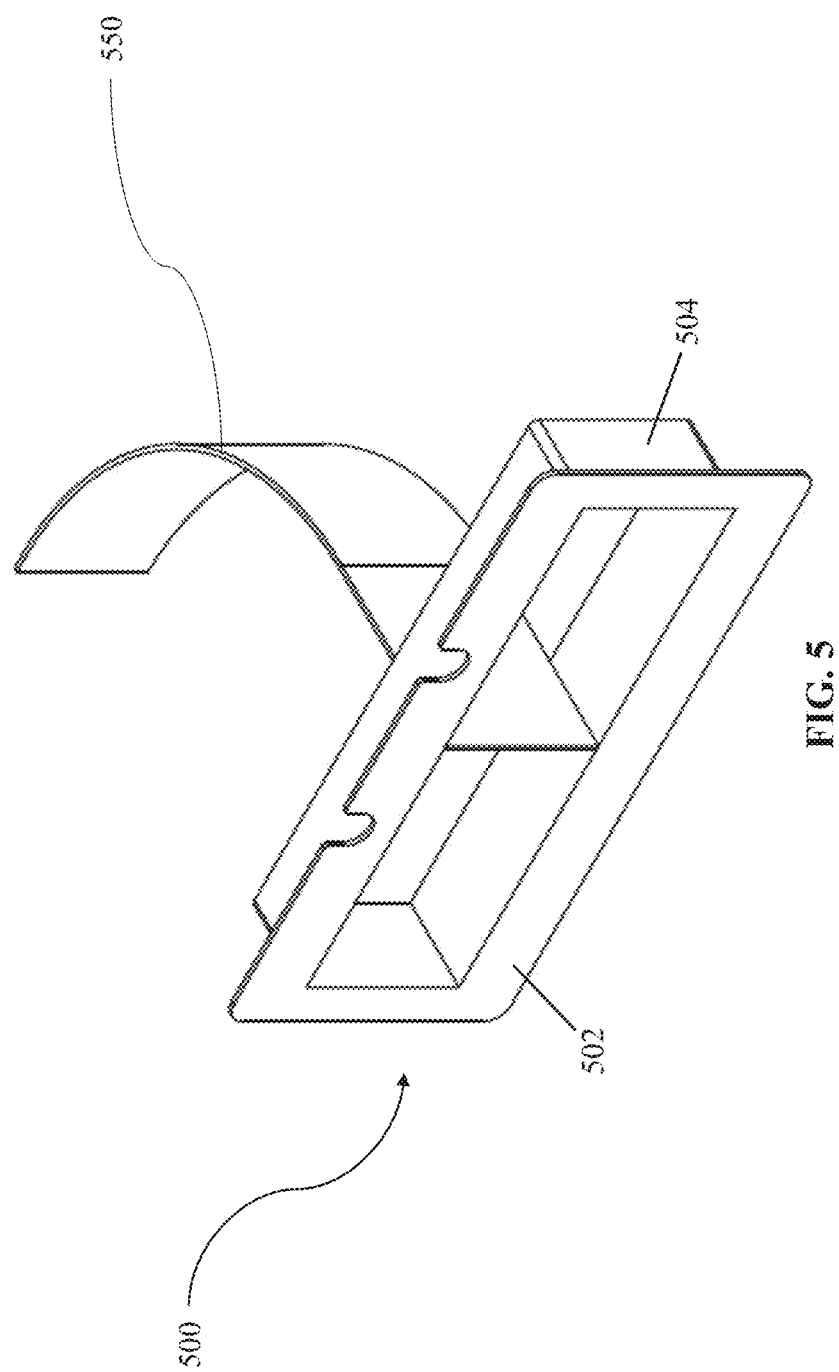
FIG. 5 illustrates a further alternative sleeve insert according to the present disclosure.

Although the supply duct assemblies of FIGS. 6 and 7 are illustrated with one particular type of sleeve insert 500, it is contemplated that the concepts of the present disclosure may be practiced using a variety of sleeve insert configurations to optimize the transfer of conditioned air from the AC box sleeve 500 into the remainder of the supply duct assembly of the RV. For example, FIGS. 4A, 4B, and 5 illustrate three different sleeve insert configurations. In each case, the illustrated sleeve insert 400, 500 comprises a rigid flange portion 402, 502 and a rigid insert portion 404, 504, and provides for consistent, structurally sound, and convenient securement of the tapered elbow connector 100 (see FIGS. 1 and 6) or the tapered Y-shaped connector 200 (See FIGS. 2 and 7) to the AC box sleeve 300. The sleeve insert 400, 500 further prevents collapse of the opening of the elbow connector 100 and the tapered Y-shaped connector 200 within the AC box sleeve 300.

More specifically, rigid flange portion 402, 502 of the sleeve insert 400, 500 can be mounted to the interior of the AC box sleeve 300 while the rigid insert portion 404, 504 extends through the thickness of the AC box sleeve 300 into the interior of the tapered elbow connector 100 or the tapered Y-shaped connector 200, as is illustrated in FIGS. 6 and 7. The insert portion 404, 504 of the sleeve insert 400, 500 can be sized to fit snugly within and frictionally engage the interior surfaces, that is the inside periphery, of the ductwork into which it is inserted. Duct tape may be used to secure the insert portion 404, 504 of the sleeve insert 400 within the interior surfaces of the ductwork into which it is inserted.

In the embodiments illustrated in FIGS. 6 and 7, the two opposing conditioned air passages with which the sleeve inserts 400, 500 are engaged will occupy opposing lateral sleeve walls of the conditioned air receiving sleeve 300. Typically, the recreational vehicle comprising the supply duct assembly 600, 700 will comprise a longitudinal dimension extending parallel to the sides of the recreational vehicle, and the two opposing conditioned air passages of the conditioned air receiving sleeve will face opposite sides of the recreational vehicle.

Referring collectively to FIGS. 3-8, the flange portion 402, 502 of the sleeve insert 400, 500 is sized to abut a framed portion of the conditioned air passage 330 on the lateral sleeve wall 320 of the conditioned air receiving sleeve 300 to provide for securement of the sleeve insert 400, 500 to the conditioned air receiving sleeve 300 along the framed portion of the conditioned air passage 330 with the insert portion 404, 504 extending through the connector inlet 120, 230 of the tapered duct connector. Tape or fasteners may be used to secure the rigid flange portion 402, 502 to the interior side of the AC box sleeve 300. It is contemplated that sleeve inserts 400, 500 according to the present disclosure may be conveniently fabricated from polypropylene or similar materials, although a variety of alternative materials will also fall within the scope of the present disclosure.

The sleeve insert 400 illustrated in FIG. 4B differs from the sleeve insert 400 illustrated in FIG. 4A in that it comprises an internal flow directing vane 410. The sleeve insert 500 of FIG. 5, includes an extended turning vane 550, which can be used to promote uniform airflow and reduce pressure drop in tapered elbow connectors, such as those illustrated in FIGS. 1 and 6.

FIG. 6 shows a supply duct assembly 600 having the tapered elbow connector 100 with supply ducts 610 and 620 for supplying conditioned air. The supply duct assembly 600 is accommodated around the rafters 630 in the ceiling space of the RV. Both of the inlets 614 and 622 of the supply duct 610 are fluidly connected to an AC unit via the AC box sleeve 300.

Figure 8:
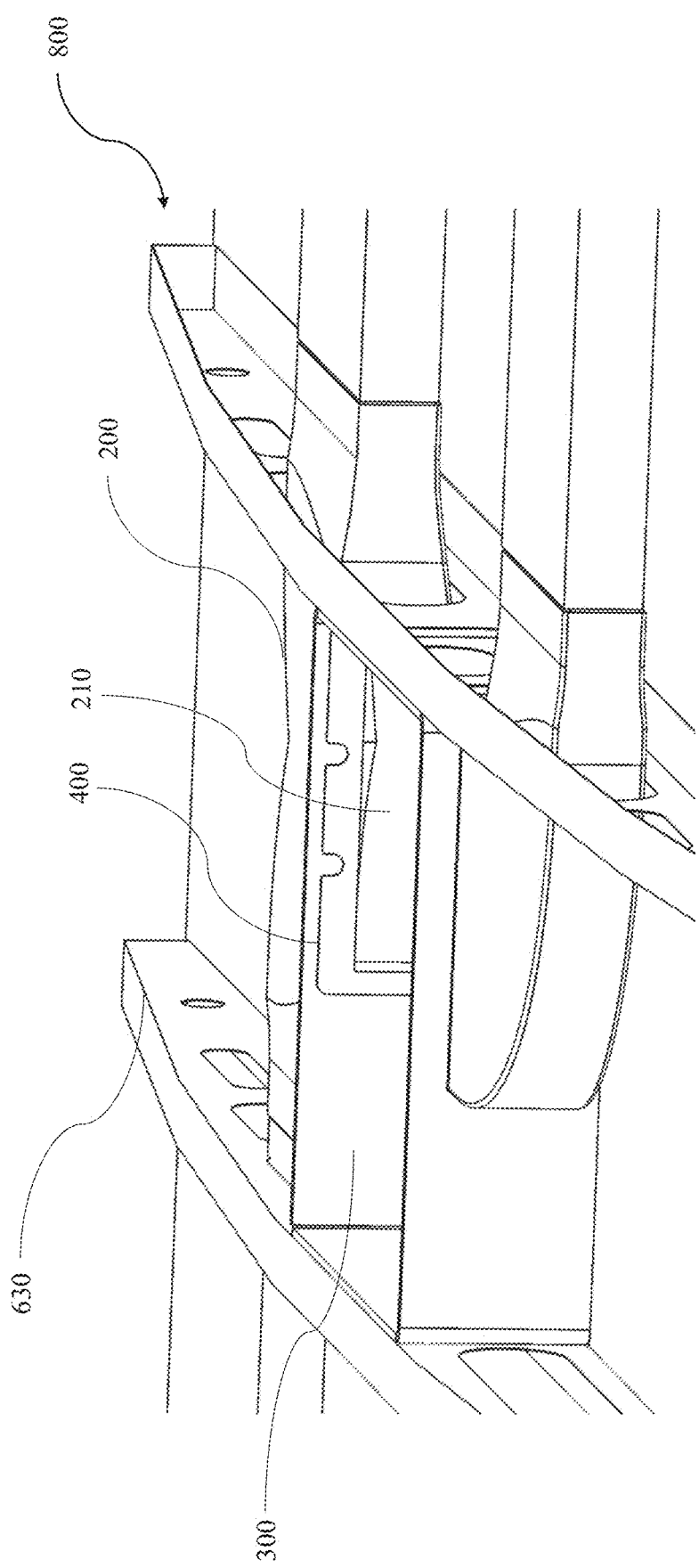

FIG. 7 depicts a supply duct assembly 700 having a tapered Y-shaped connector 200 in place of one of the tapered elbow connectors 100 illustrated in the embodiment of FIG. 6. FIG. 8 depicts a close-up view of the connection between AC box sleeve 300 and the tapered Y-shaped connector 200, as described in FIG. 7.

FIG. 8 illustrates a supply duct assembly 800 fit within the rafters 630 of an RV. In this embodiment, the sleeve insert 400 of FIG. 4A is fit with the AC box sleeve 300 and the tapered Y-shaped connector 200.

Figure 9A:
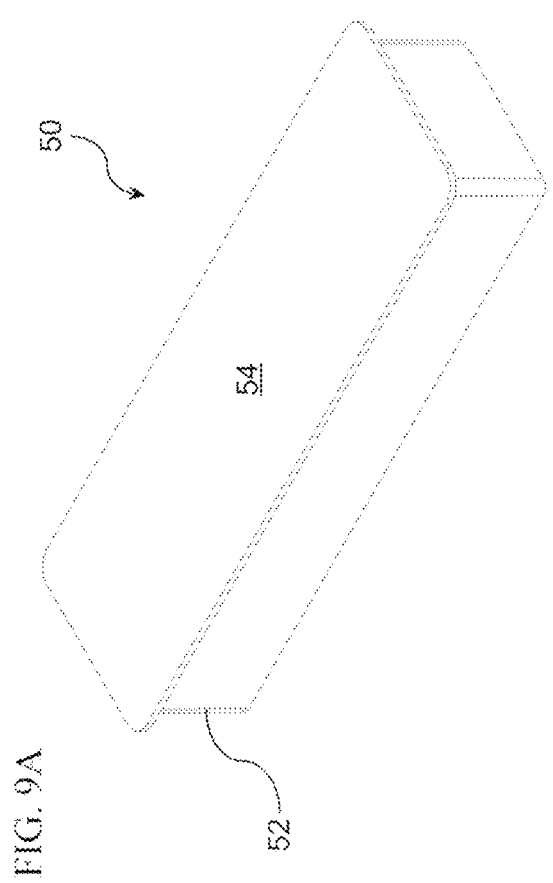
FIGS. 9A and 9B illustrate a duct plug according to one embodiment of the present disclosure.
Figure 9B:
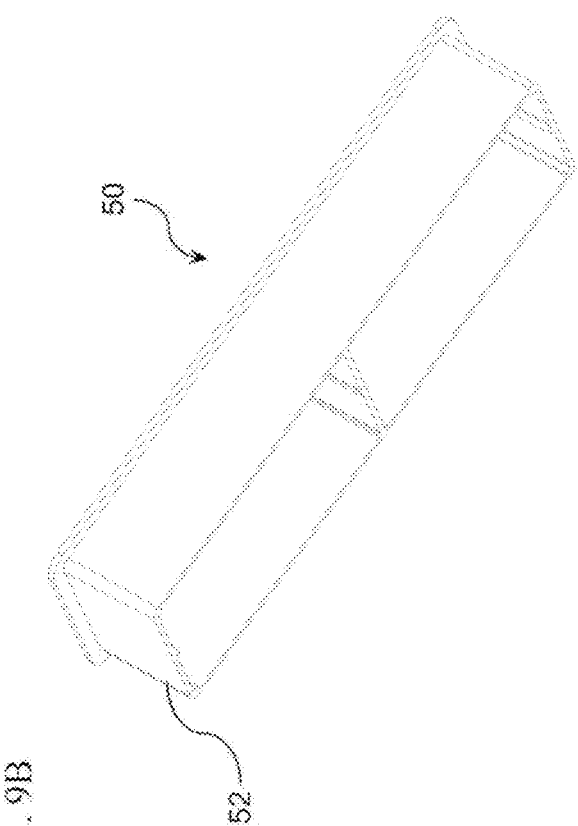

FIGS. 9A and 9B are respective isometric views of a duct plug 50 that may be used to terminate otherwise open ends of supply duct runs such as, for example, the ends of supply ducts 610 and 620 of FIG. 6. The duct plug 50 comprises an insert portion 52 that is designed to fit snugly within the open end of the supply duct run, and a closed flange 54 that provides a sealed hard stop at the end of the supply duct run. The present inventors have found that duct plugs used in this manner can improve overall airflow from the AC unit into the interior of the RV and are more reliable than systems where the ends of the supply duct runs are pinched closed and terminated with sealing tape. The duct plug 50 may, for example, be fabricated from polypropylene.

The AC box sleeve, tapered elbow connectors, tapered Y-shaped ducts, sleeve inserts, alternative sleeve inserts, and duct plugs contemplated herein can be advantageously adapted to accommodate a variety of different rafter configurations having varying bottom plate dimensions, clearance heights, and clearance widths for use in different RVs having different rafter configurations, and a variety of different air conditioning units.

For example, and not by way of limitation, it is contemplated that an AC box sleeve may have a height of about 4-5 inches and side lengths of about 14-15 inches. The openings for receiving the sleeve inserts may have a length of about 8 inches and a height of about 2-3 inches.

Similarly, and not by way of limitation, in one embodiment, the tapered elbow connector is constructed to have a connector inlet dimension of about 8.0 inches by 2.63 inches, a connector outlet dimension of about 8.5 inches by 1.9 inches, an inner radius of curvature of about 1.25 inches, and an outer radius of curvature of about 1.38 inches. In this embodiment, the inlet has a total area of about 21.04 square inches and the outlet has a total area of about 16.15 square inches. The average slope, representing a net increase in a transitional duct height of the connector along a linear projection from the middle of the top edge the connector outlet to the middle of the top edge the connector inlet is between about 0.05 and about 0.10, to prevent undue turbulence in the connector but also permit a sufficient change in cross sectional flow area between the inlet and the outlet. In this embodiment, the inlet is about 30% larger in cross section than the outlet. More broadly, it is contemplated that other embodiments of the tapered elbow connector will most advantageously have an inlet that is at least about 20% larger in cross section than the outlet or, more specifically, between about 20% and about 40% larger than the outlet.

The tapered Y-shaped connectors of the present disclosure may be constructed to have dimensions similar to the tapered elbow connector. Regardless of the type of tapered duct connector employed in accordance with the teachings of the present disclosure, it is contemplated that the tapered duct connector may comprise a transitional duct width that decreases from the connector outlet to the connector inlet as the transitional duct height increases from the connector outlet to the connector inlet. In addition, the respective magnitudes of decreasing transitional duct width and increasing transitional duct height may be such that the cross-sectional flow area of the connector inlet will be at least approximately 20% larger than a cross-sectional flow area of the connector outlet. In some embodiments, the connector inlet may comprise a cross-sectional flow area that is between approximately 20% and approximately 40% larger than a cross-sectional flow area of the connector outlet.

To further optimize mass flow transfer from the conditioned air receiving sleeve to the supply duct without undue turbulence, although the transitional duct height of the tapered duct connector increases by a factor of at least about 1.25, it may be preferable to ensure that the average slope in the transitional duct height of the connector from the connector outlet to the connector inlet is not too large. Even with a slope of between about 0.05 and about 0.10, it will be possible to ensure that the cross-sectional flow area at the connector inlet is at least approximately 20% larger than a cross-sectional flow area of the connector outlet. In many instances it may be optimal to ensure that the connector inlet comprises a cross-sectional flow area that is between approximately 20% and approximately 40% larger than a cross-sectional flow area of the connector outlet.

The sleeve inserts, duct joiners and duct plugs of the present disclosure should be constructed to close-fit engagement with complementary components of the supply duct assembly.

Figure 10:
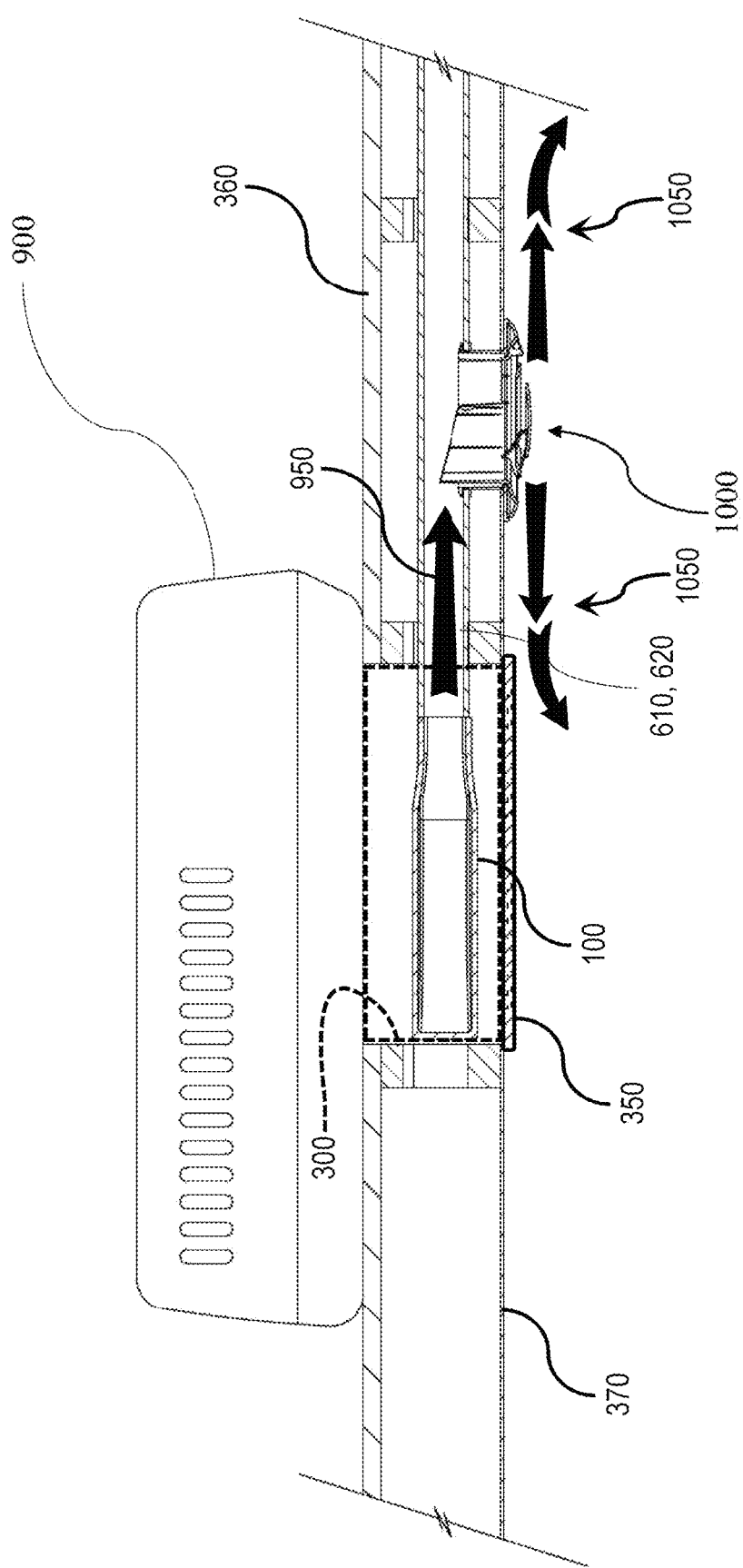
FIG. 10 illustrates a roof-mounted AC unit, in-duct air flow within a portion of a supply duct assembly of an RV, a diffusing vent assembly, and diffuse omni-directional air flow from the diffusing vent assembly into the interior of an RV.

Referring to FIGS. 10-17, embodiments of the present disclosure further relate to the provision of a diffusing assembly 1000 in cooperation with an AC unit 900, return air assembly 350, and the aforementioned supply duct assemblies 600, 700 of a recreational vehicle which, in the illustrated embodiment, include an AC box sleeve 300, a tapered elbow connector 100, and supply ducts 610, 620. The AC box sleeve 300 is shown with dashed lines in FIG. 10 to help illustrate its relative positioning in the infra-ceiling space of the RV, but it would not actually be visible in the particular cross-section chosen for FIG. 10. Although FIG. 10 depicts the AC unit 900 installed on the roof of the RV in one particular configuration, this example is merely presented for illustrative purposes and it is noted that the concepts of the present disclosure are not limited to the specific system configuration illustrated in FIG. 10. The particular configuration specifics of the AC unit 900 and the return air assembly 350 are beyond the scope of the present disclosure and may be gleaned from conventional or yet-to-be developed teachings on the subjects.

In the configuration illustrated in FIG. 10, in-duct conditioned air 950 flows from an AC unit 900, into the AC box sleeve 300, through a tapered elbow connector 100, to the supply ducts 610, 620 of the system. The conditioned air then passes to the interior of the RV via the diffusing assembly 1000, which improves the airflow from the supply ducts into the interior of the RV and increases the efficiency of the AC unit 900. Return air passes through a return air grille of the return air assembly 350, back to the AC unit 900 for recirculation or exhaust. Notably, the AC box sleeve 300 spans the height of the infra-ceiling space between the AC unit 900 and the return air assembly 350. More specifically, the infra-ceiling space is the space between the exterior RV roofing layer 360 and the interior ceiling board 370 of the RV. An AC box sleeve "spans" this infra-ceiling space by extending the entirety of the distance between the RV roofing layer 360 and the interior ceiling board 370, with the understanding that the sleeve may extend beyond the roofing layer 360, the ceiling board 370, or both, or that supplemental sealing elements, such as gaskets, seals, etc., may be provided to contribute to this span.

Where a recreational vehicle according to the present disclosure comprises a roof-mounted AC unit 900 and a ceiling-mounted return air assembly 350, it is contemplated that the roof-mounted AC unit 900 and the ceiling-mounted return air assembly 350 may enclose opposite sides of the conditioned air receiving sleeve 300, with the roof-mounted AC unit 900 over the conditioned air opening of the conditioned air receiving sleeve 300 and the return air assembly 350 over the return air opening of the conditioned air receiving sleeve.

Figure 11:
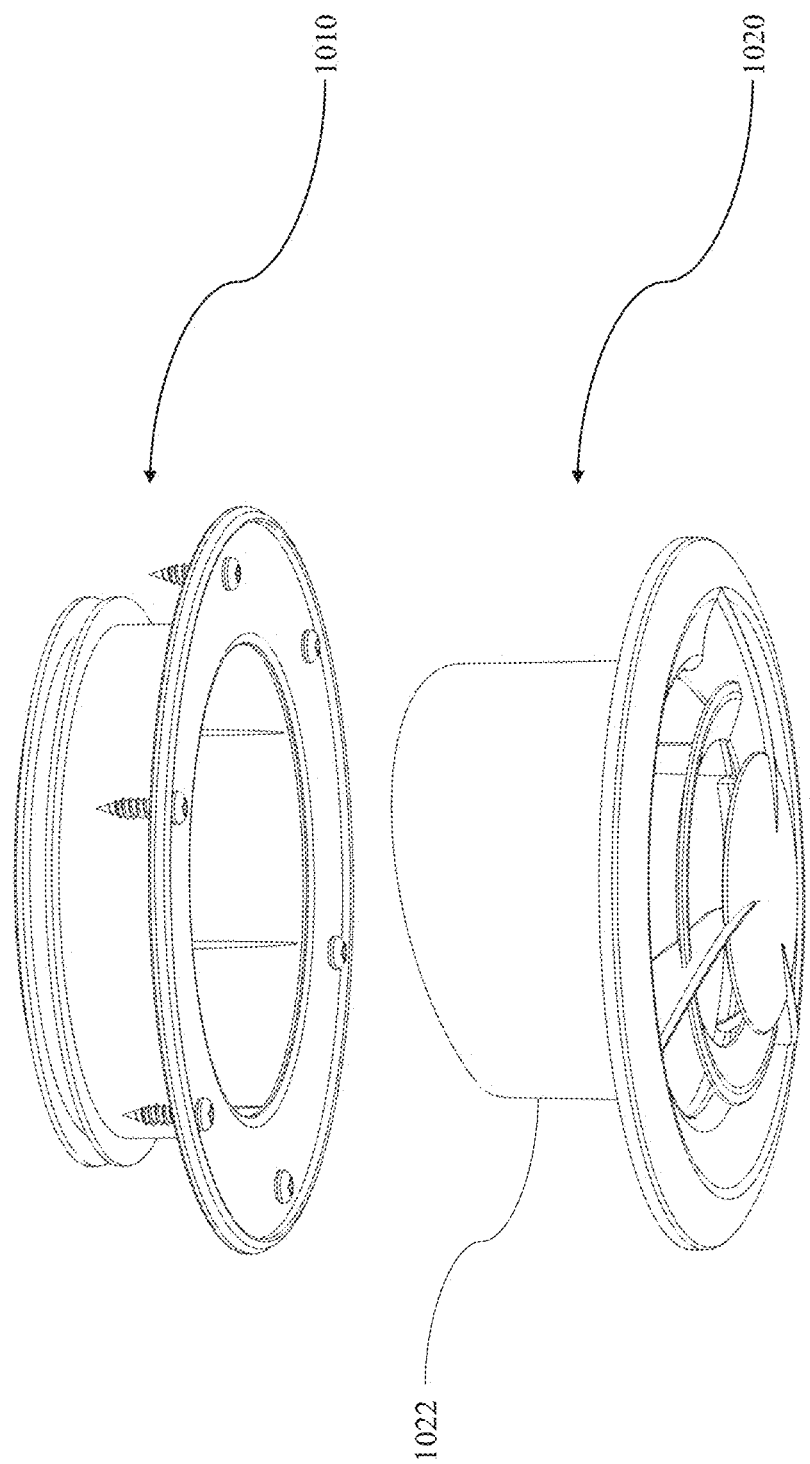
FIG. 11 illustrates components of a diffusing vent assembly according to one embodiment of the present disclosure.

Referring specifically to FIG. 11, the diffusing assembly 1000 comprises a diffuser base 1010 and a diffusing head 1020. The diffusing head 1020 comprises an air blade 1022 that is configured to extend into the path of the in-duct air flow 950 illustrated in FIG. 10.

Figure 12:
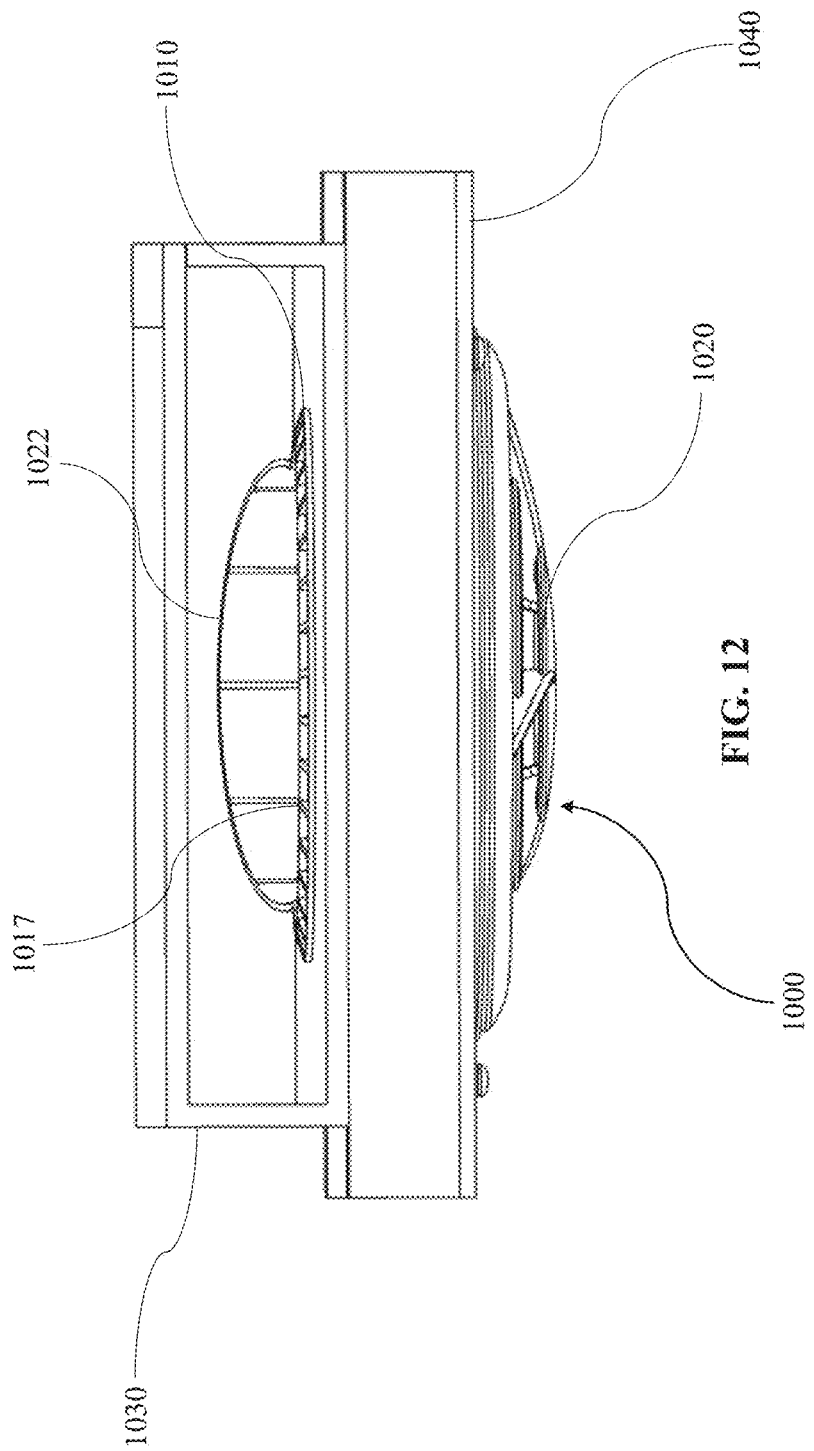
FIGS. 12-14 illustrate the diffusing vent assembly of FIG. 11 in an installed state.
Figure 13:
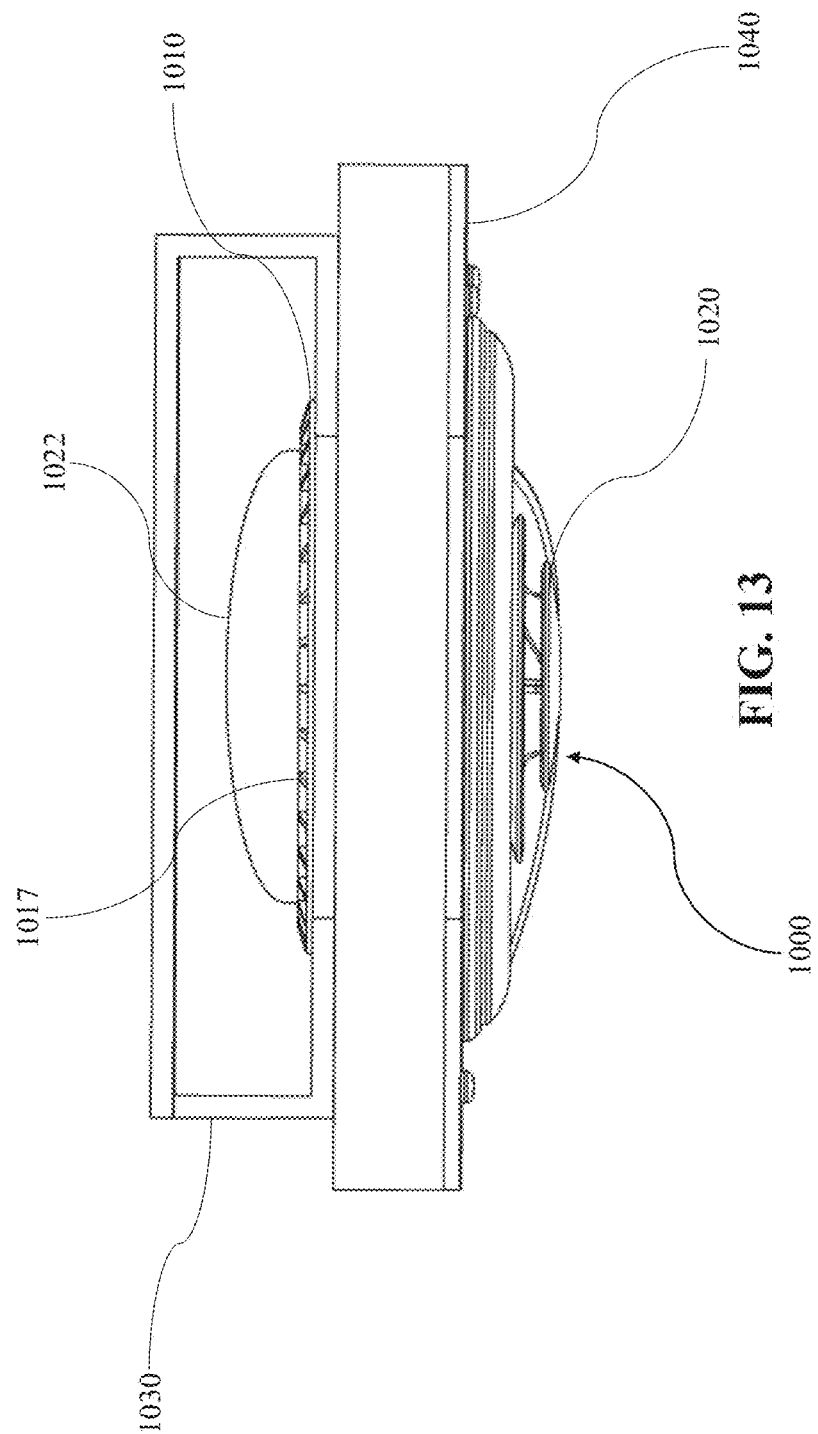

FIGS. 12 and 13 show opposing cross-sectional views of a portion of an RV ceiling including a supply duct 1030 and a ceiling board 1040. A diffusing assembly 1000 is installed in the RV ceiling, with the air blade 1022 extending into the supply duct 1030. The ceiling board 1040 is spaced from the supply duct 1030. This spacing forms a gap in the ceiling which is spanned by a portion of the diffusing assembly 1000. The diffuser base 1010 spans the gap between the ceiling board 1040 and the supply duct 1030, and includes the air blade 1022, which extends into the supply duct 1030. The diffusing assembly 1000 can be installed by inserting the diffuser base 1010 through aligned circular openings in the ceiling board 1040 and supply duct 1030, securing the diffuser base 1010 to the ceiling board 1040, sliding the diffusing head 1020 into the diffuser base 1010, and securing the diffusing head 1020 to the diffuser base 1010 with, e.g., a snap lock. The installation process of the diffusing assembly 1000 is described below in greater detail.

Once the diffusing assembly 1000 has been completely installed, the diffusing head 1020 is capable of 360° rotation within the diffuser base 1010. Although the diffusing head is designed to be rotated manually, motorized or other automated rotation is also contemplated in the scope of the present disclosure. When the diffusing head 1020 is rotated, so is the air blade 1022. Through this rotational control, the air blade 1022 can be used to regulate the flow of conditioned air as it travels from the supply duct 1030, through the diffusing assembly 1000, and ultimately into the interior of the RV.

Figure 14:
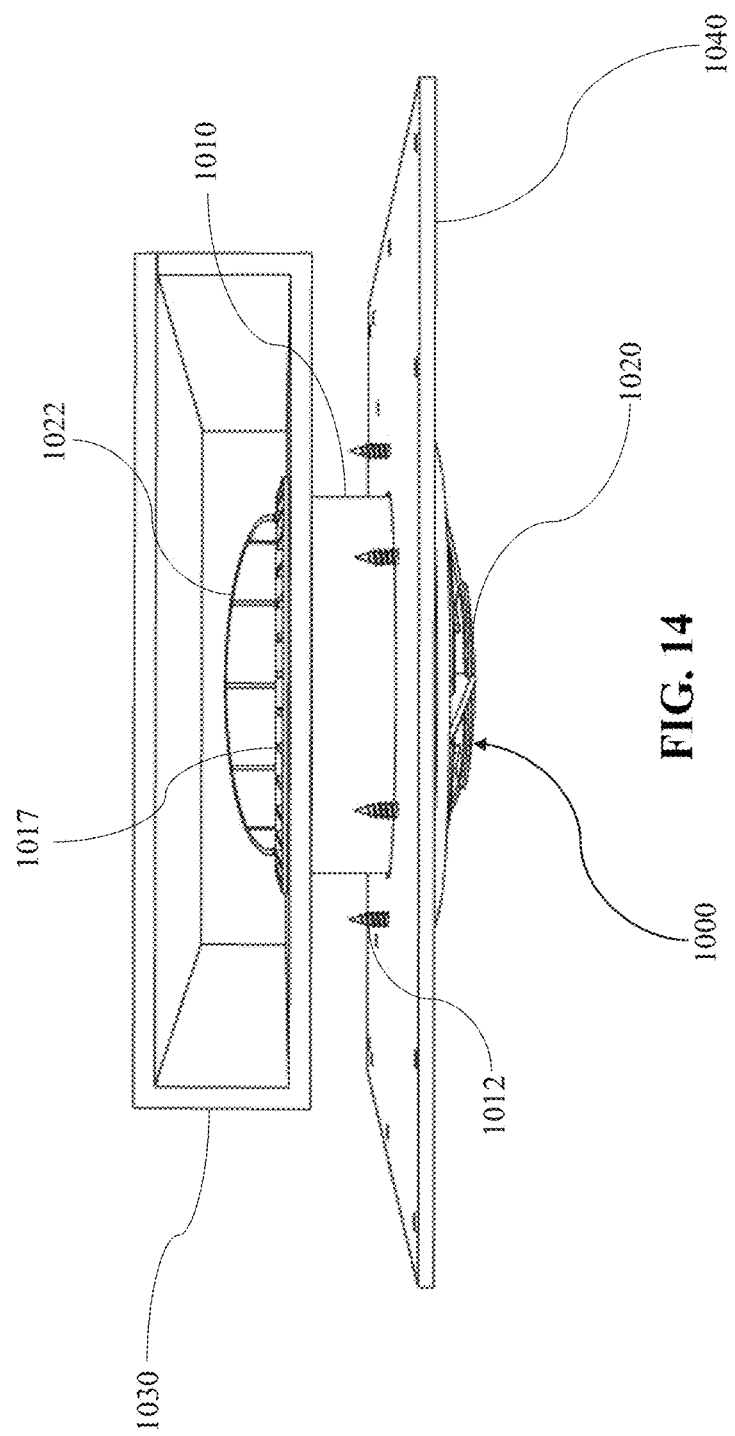

FIG. 14 also shows the diffusing assembly 1000 in the installed state. Here, the body of the diffuser base 1010 is shown in relation to both the supply duct 1030 and the ceiling board 1040 of the RV.

Figure 15:
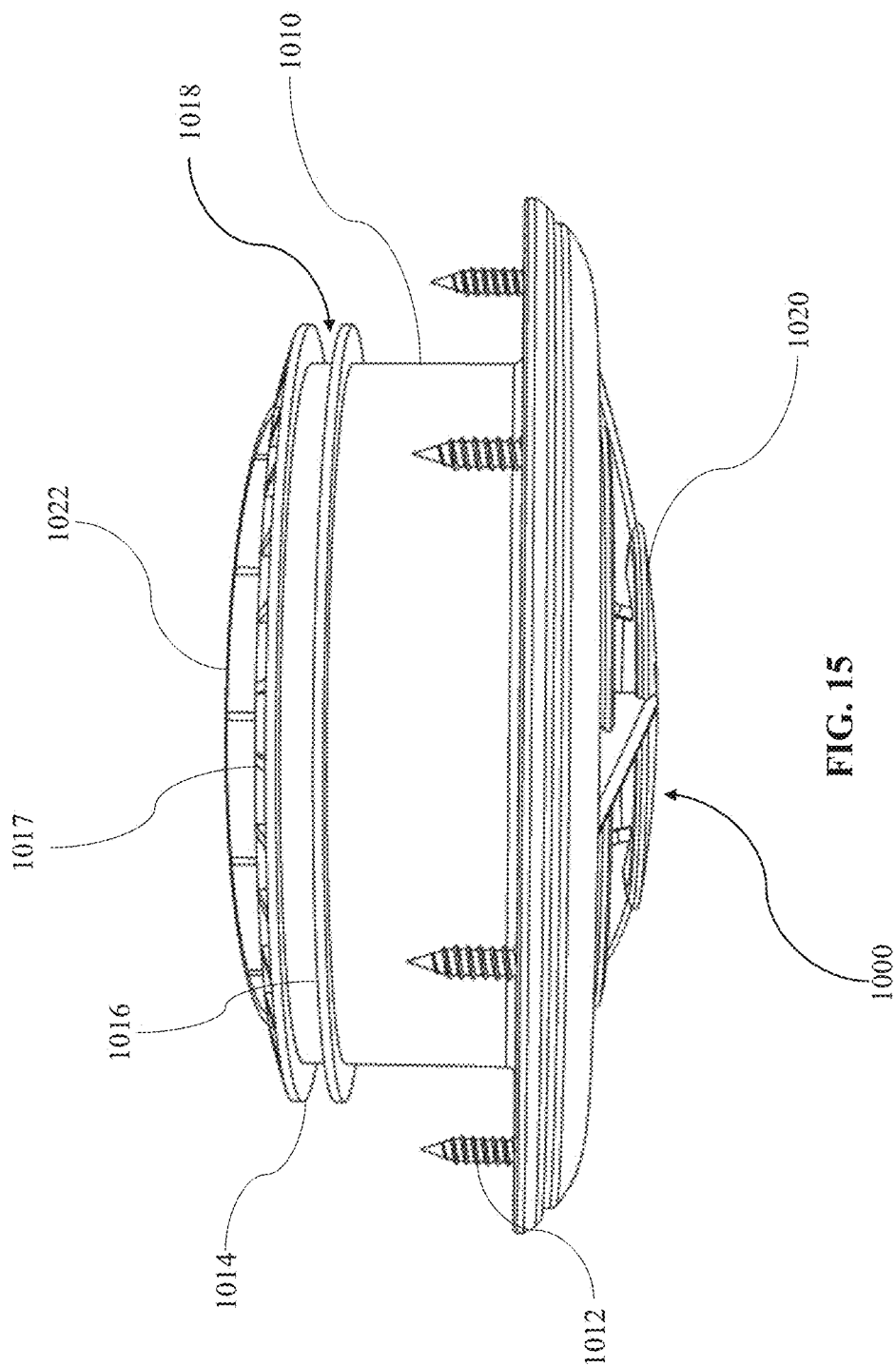
FIG. 15 illustrates the diffusing vent assembly of FIG. 11 in an assembled but uninstalled state.

FIG. 15 shows the diffusing assembly without the supply duct or ceiling board of the RV. Here, a first receiving ring 1014 and a second receiving ring 1016 of the diffuser base 1010 may be observed. The first receiving ring 1014 and the second receiving ring 1016 form a channel 1018 that is configured to receive the thickness of the material of the edge of the supply duct 1030 wall after it is manipulated over the first receiving ring 1014 in the manner described below. The channel 1018 may define a constant height, as illustrated, or may gradually taper to define a decreasing height in a decreasing radial direction. With or without the taper, the aforementioned engagement of the material of the supply duct in the channel 1018, help create an airtight, or nearly airtight, seal between the supply duct 1030 and the diffuser base 1010. FIG. 15 also shows the diffuser base 1010 without the ceiling board 1040.

Referring collectively to FIGS. 14-15, to install the diffusing assembly 1000 in the RV ceiling, the first receiving ring 1014 and the second receiving ring 1016 of the diffuser base 1010 are inserted through a circular opening in the ceiling board 1040. Then, the first receiving ring 1014 is inserted through a corresponding circular opening in the supply duct 1030. In this manner, the first receiving ring 1014 is engaged with an interior surface of the supply duct 1030 and the second receiving ring 1016 is engaged with an exterior surface of the supply duct 1030, leaving the material of the supply duct 1030 wall sandwiched between the first and second receiving rings 1014, 1016. This configuration creates an airtight, or nearly airtight, seal between the receiving rings 1014, 1016 and the material of the supply duct 1030. It is contemplated that the material of the supply duct may also engage an outside diameter of the diffuser base 1010 in the channel 1018 for further sealing. In embodiments, the thickness of the material of the supply duct 1030 is slightly smaller than the height of the channel 1018. For example, in one embodiment, the supply duct wall thickness is about 0.20 inches, while the channel 1018 has a corresponding height of 0.22 inches. In other embodiments, the channel 1018 has a height that is equal to the thickness of the material of the supply duct 1030.

The diffuser base 1010 may be secured to the ceiling board 1040 with a fastener 1012, such as a screw, nail, tack, or the like. Alternatively, the diffuser base 1010 may be secured to the ceiling board 1040 with an adhesive, such as glue, rubber cement, epoxy, urethanes, or the like.

Typically, the insider diameter of the circular opening in the ceiling board 1040 is smaller than the outsider diameter of the first receiving ring 1014. As such, in embodiments, the diffusing assembly, and any of its components, may be formed from a pliable and resilient material so that it can be manipulated through the circular opening in the ceiling board 1040. Moreover, because the inside diameter of the aforementioned circular opening in the supply duct 1030 is smaller than the outside diameter of the first receiving ring 1014, the material of the supply duct must be manipulated over the first receiving ring 1014 into the channel 118 between the first and second receiving rings as the diffuser base 1010 is inserted through the circular opening in the supply duct 1030. The cylindrical passage of the diffuser base 1010 is large enough to allow an installer to reach through the diffuser base 1010, into the interior of the supply duct 1030 and manipulate the material of the supply duct 1030 over the first receiving ring 1014 into the channel 118 between the first and second receiving rings 1014, 1018. This process may be enhanced by providing gusseted chamfers 1017 on the first receiving ring 1014 and by ensuring that the material of the supply duct 1030 is manipulable but resilient enough to return to its original size and shape after it has been manipulated to fit over the first receiving ring. The material and construction of the diffuser base 1010 may also be selected and designed to be similarly manipulable and resilient, to further aid the installation process.

As previously stated, once the diffusing base 1010 is secured to the ceiling board 1040, the diffusing head 1020 is slid into the diffusing base 1010. The diffusing head 1020 is then secured to the diffusing base 1010 with any suitable locking mechanism. Once the diffusing head 1020 is installed and secured to the diffusing base 1010, the diffusing assembly 1000 is operational.

FIGS. 16A-16F show various additional views of the diffuser base 1010. The diffuser base 1010 may include a diffuser flange 1011 that includes fastener openings 1013 that are configured to receive fasteners, e.g., screws. The diffuser flange 1011 may be substantially circular or any other suitable shape. Similarly, the diffuser base 1010 may include a collar 1015 that is substantially perpendicular to the diffuser flange 1011 and is configured to receive and conduct air from the supply duct. The collar 1015 may also be substantially circular or any other suitable shape.

Figure 16A:
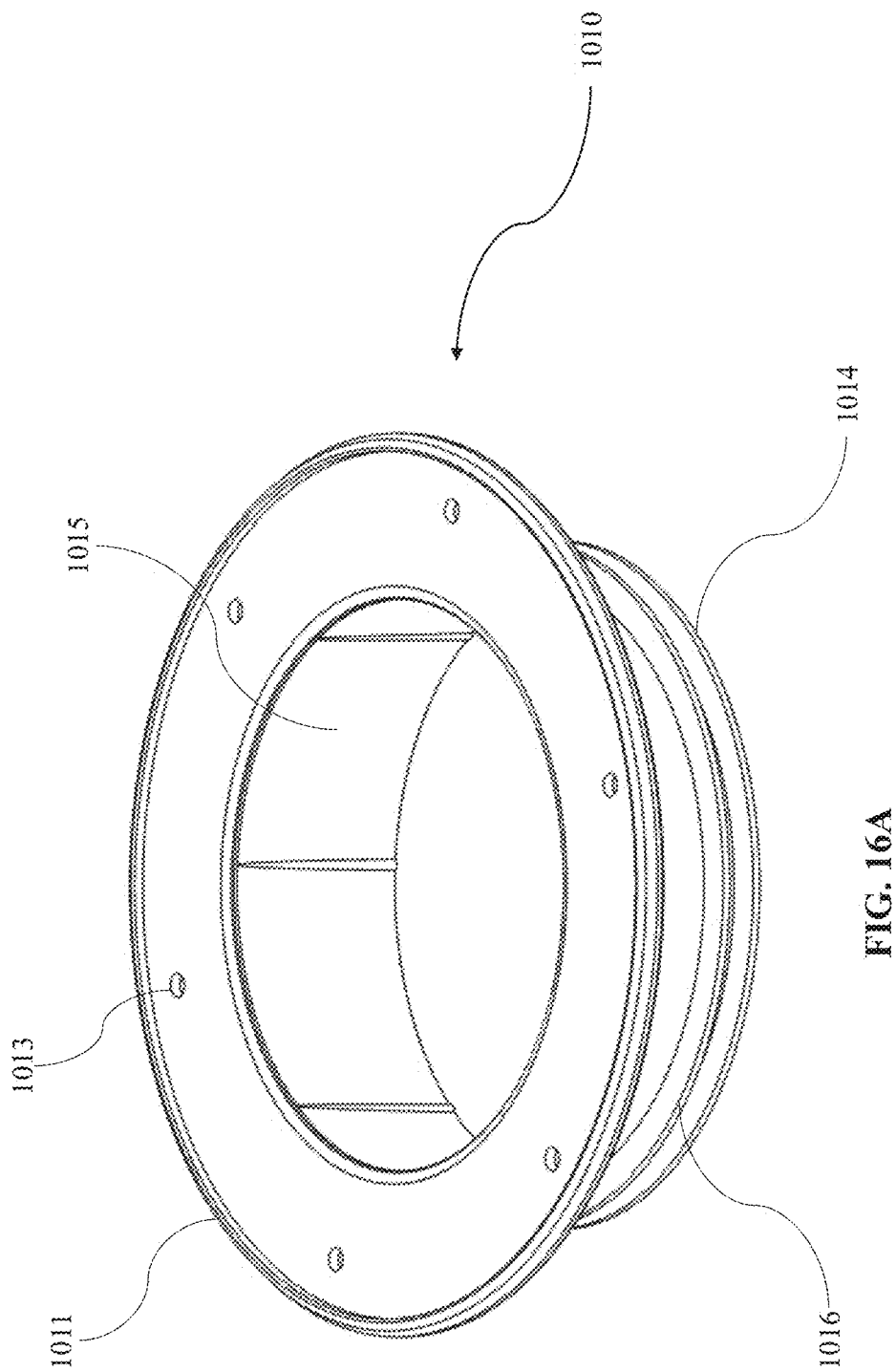
Figure 16B:
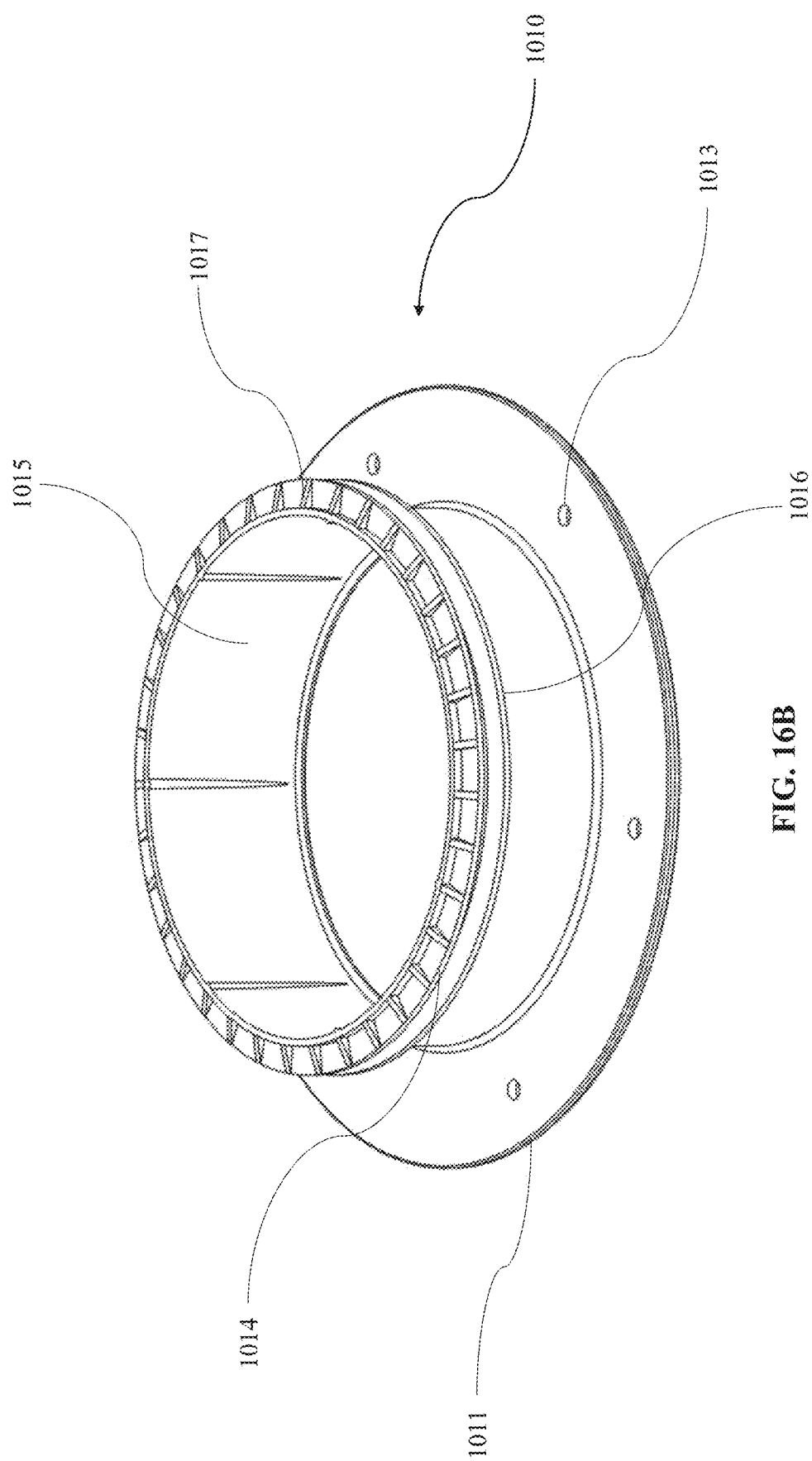
Figure 16C:
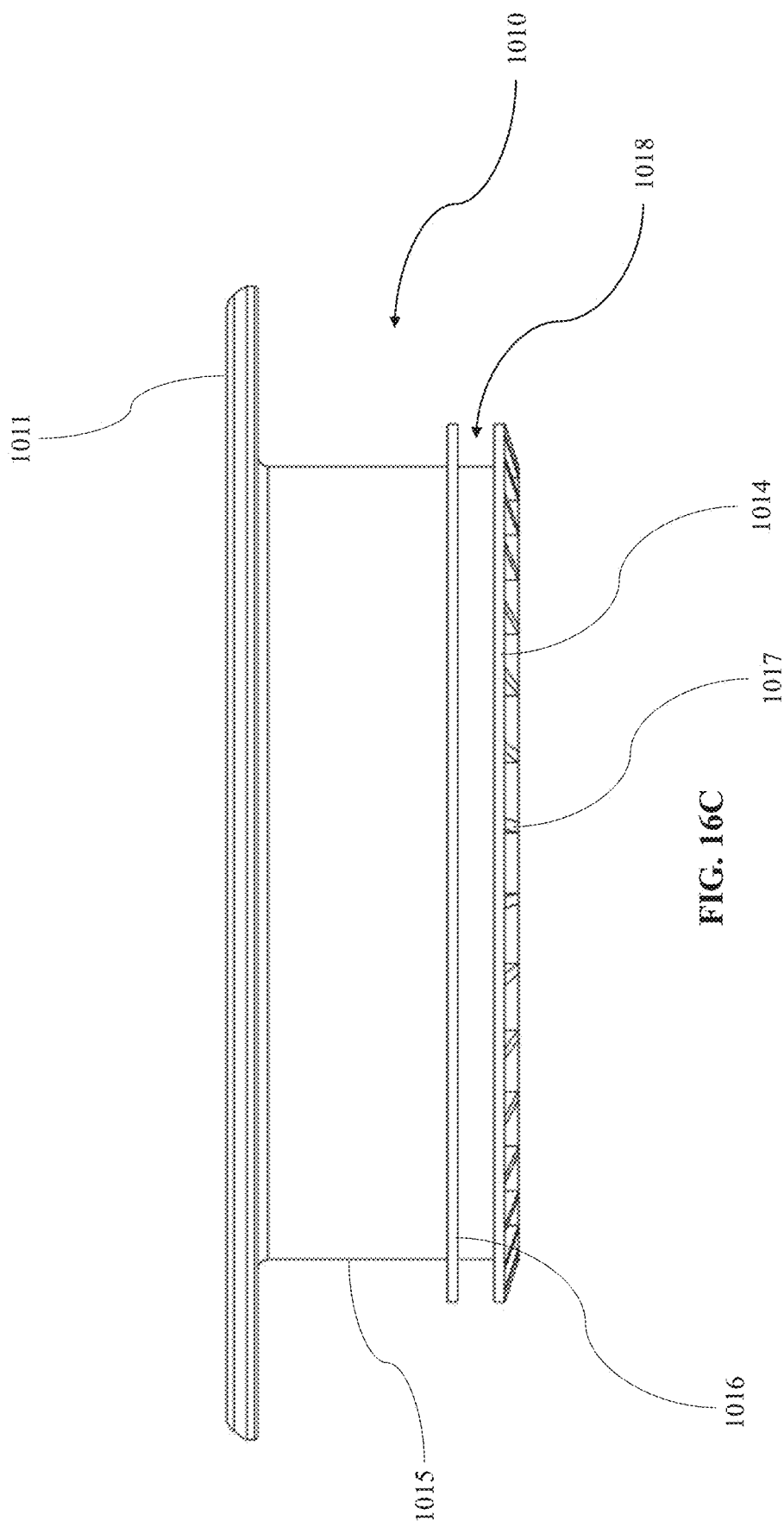
Figure 16D:
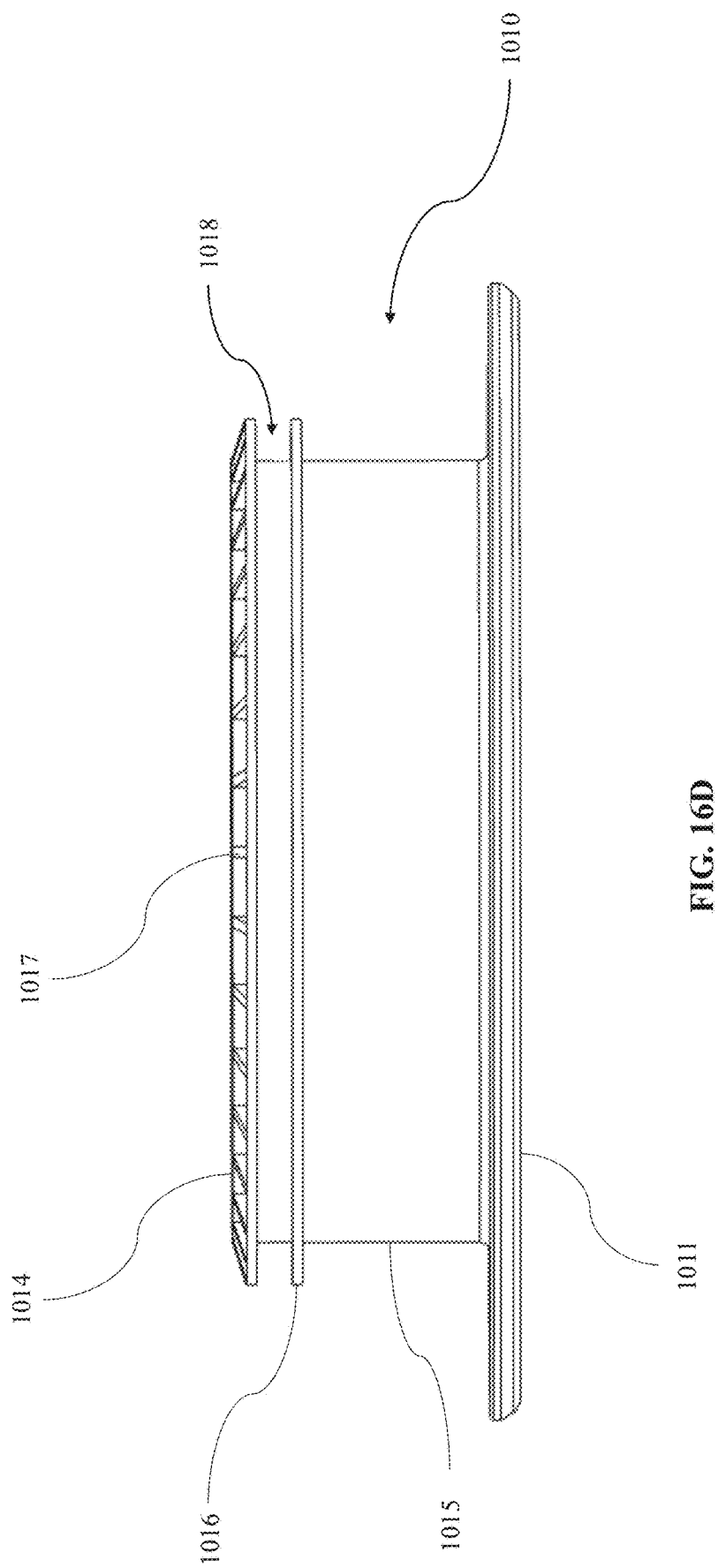
Figure 16F:
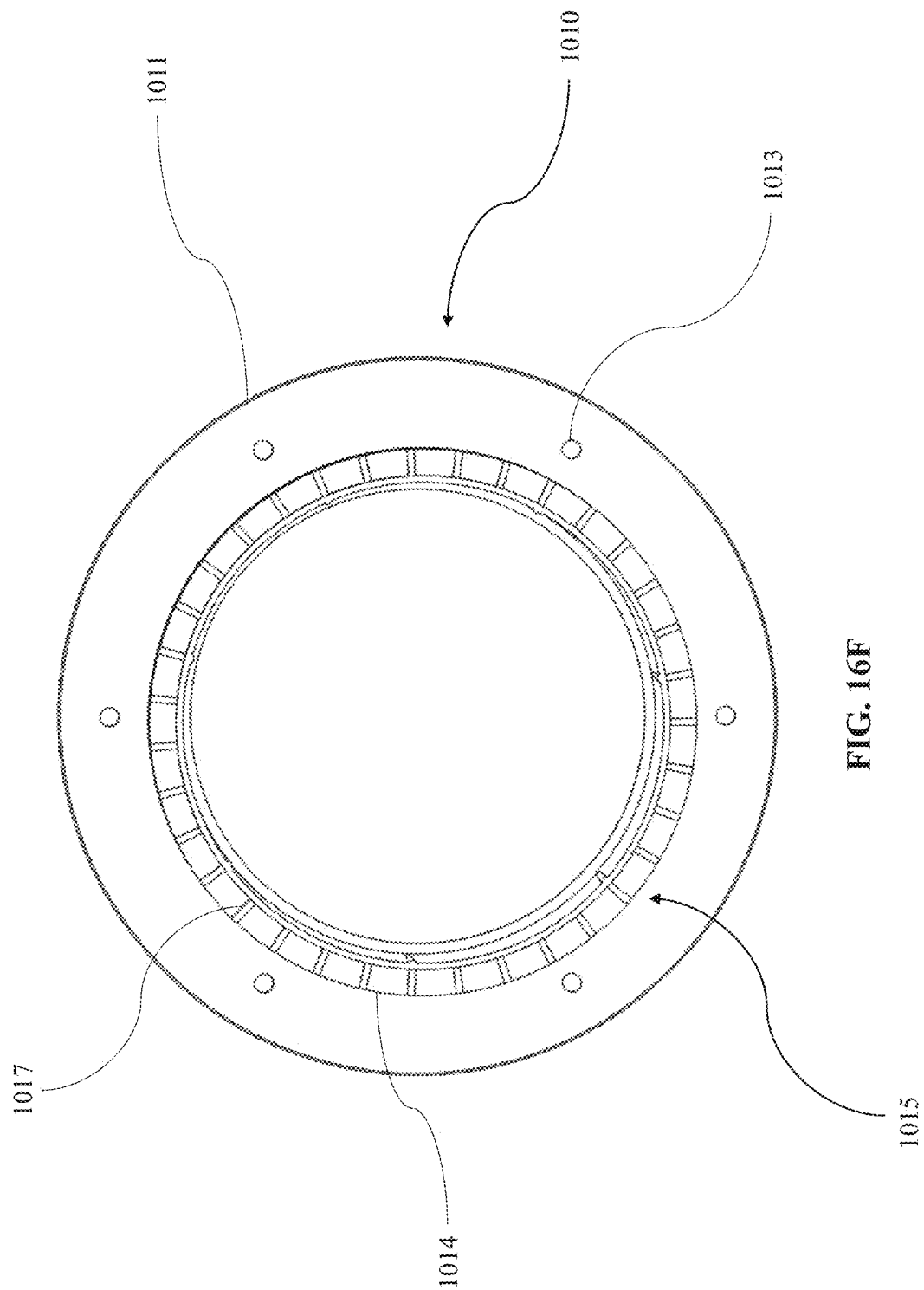

As shown in greater detail in FIG. 16D, the gusseted chamfers 1017 of the first receiving ring 1014 minimize the amount of material necessary to form the diffusing assembly 1000 and may increase the aforementioned pliability and resiliency of the first receiving ring 1017, and therefore the flexibility of the diffusing base 1010 as a whole.

Figure 17A:
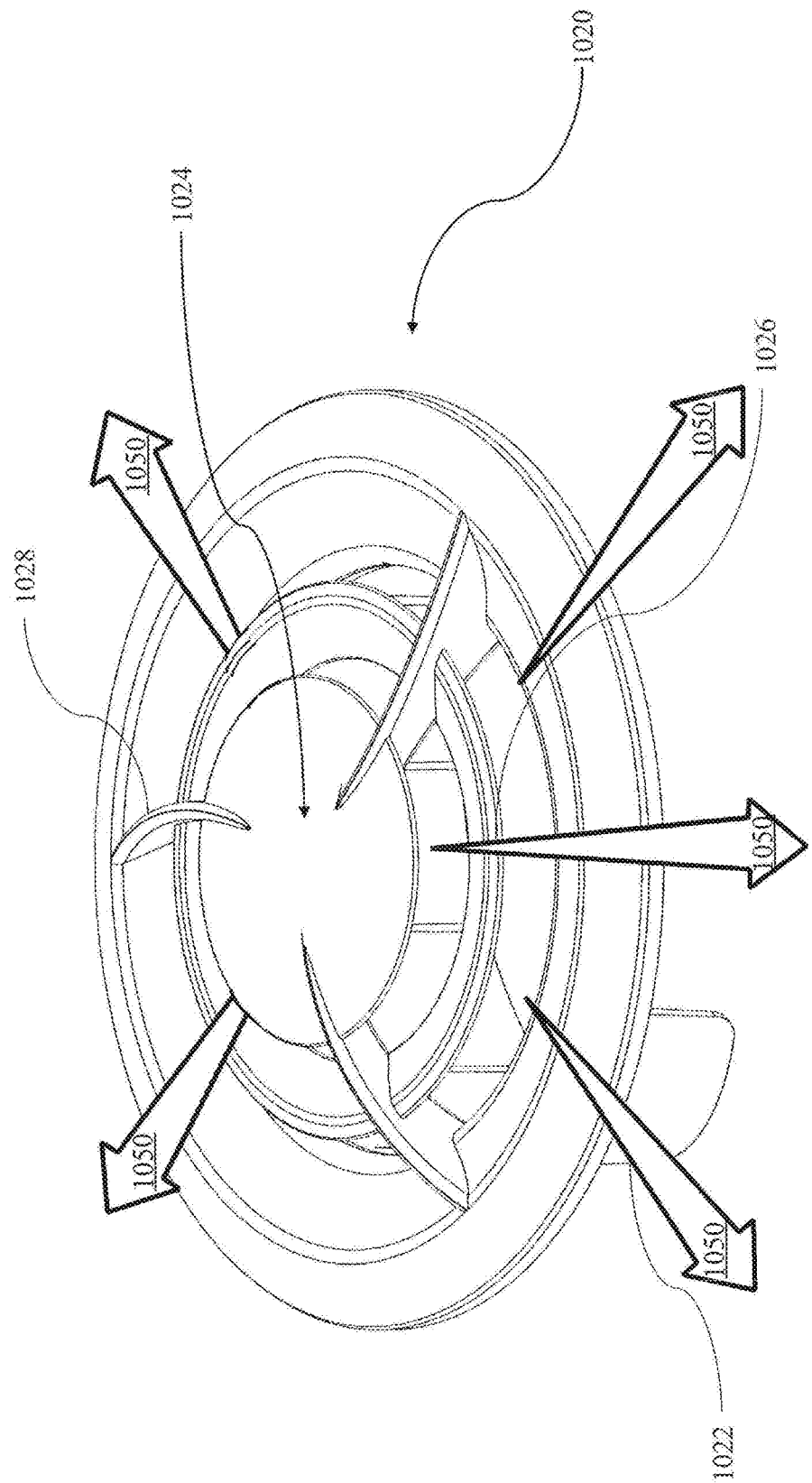
Figure 17C:
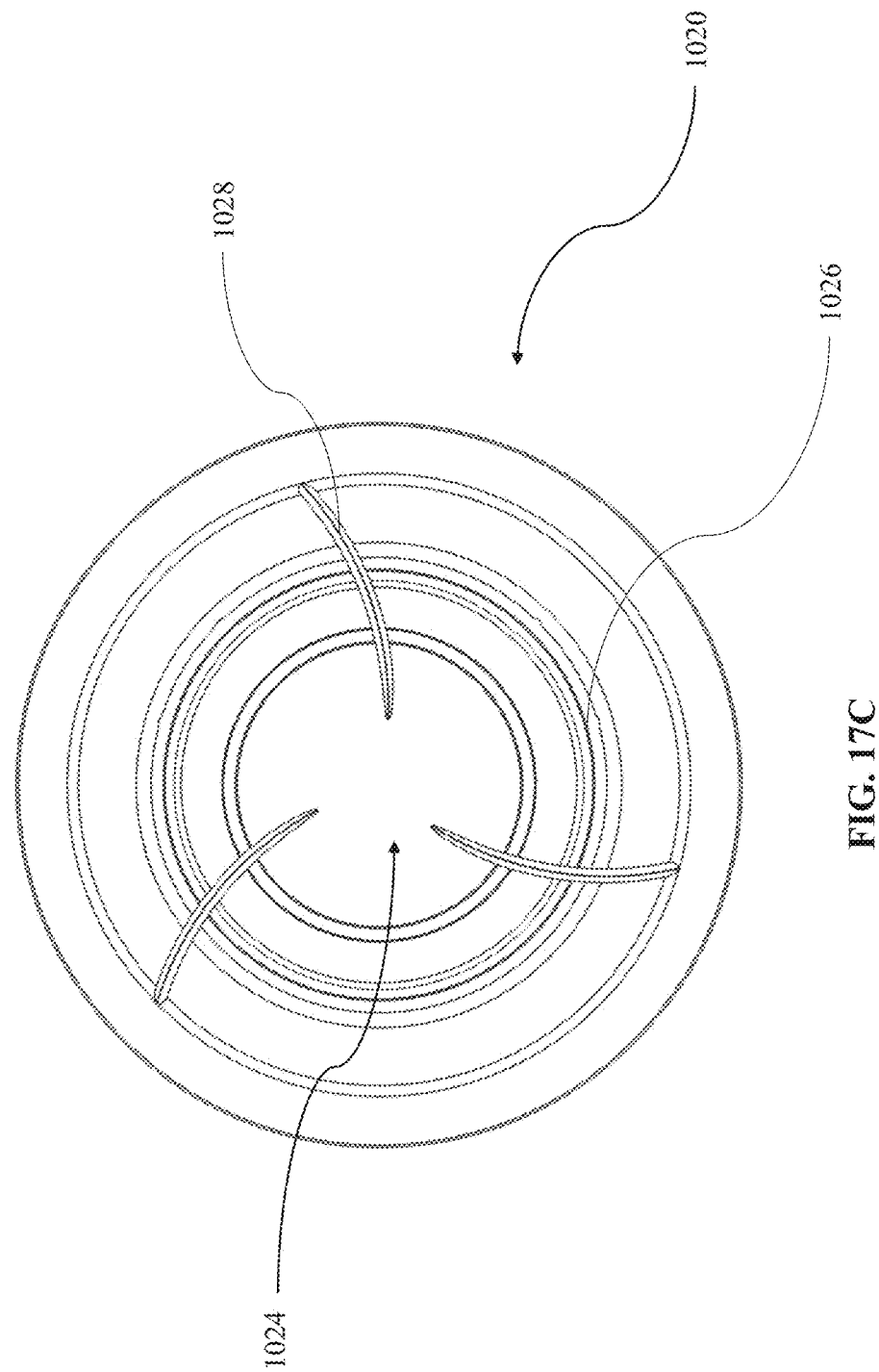
Figure 17D:
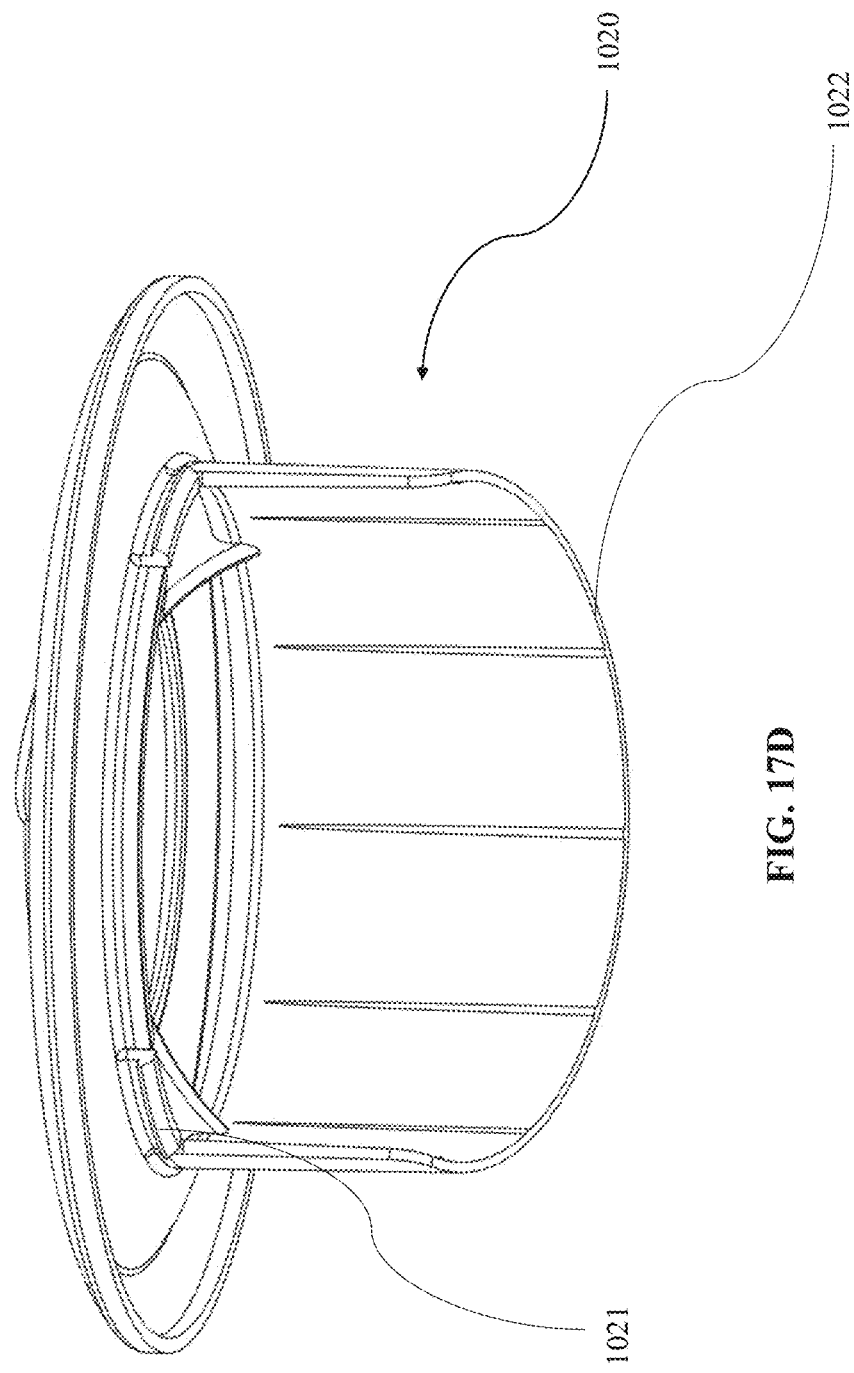
Figure 17E:
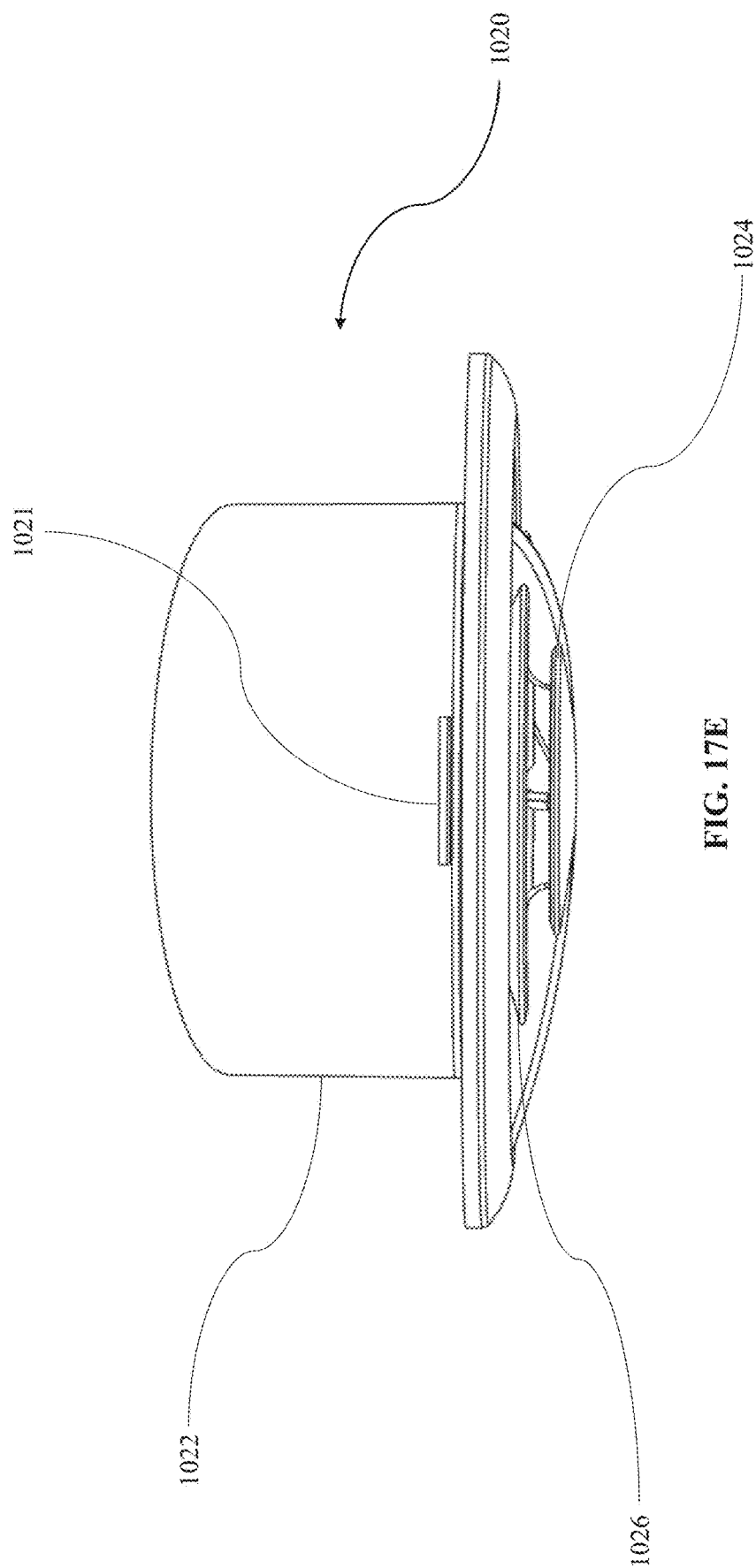
Figure 18A:
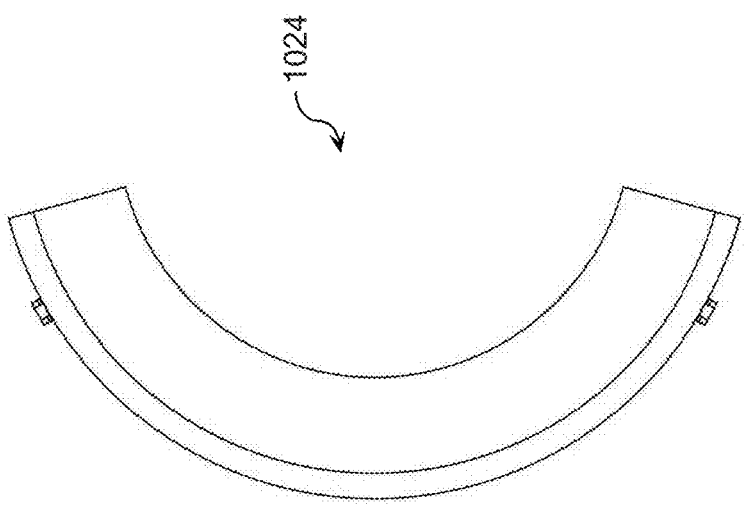
Figure 18B:
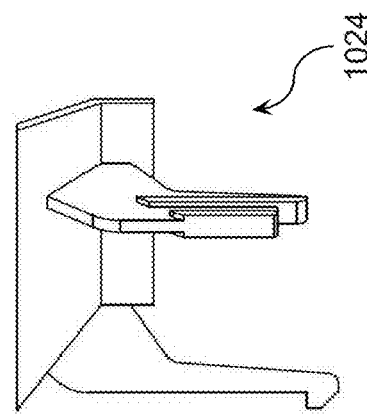
Figure 18C:
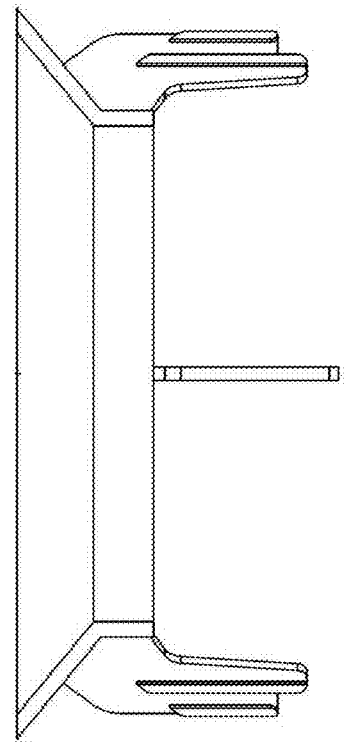
Figures 21A, 21B, 21C:
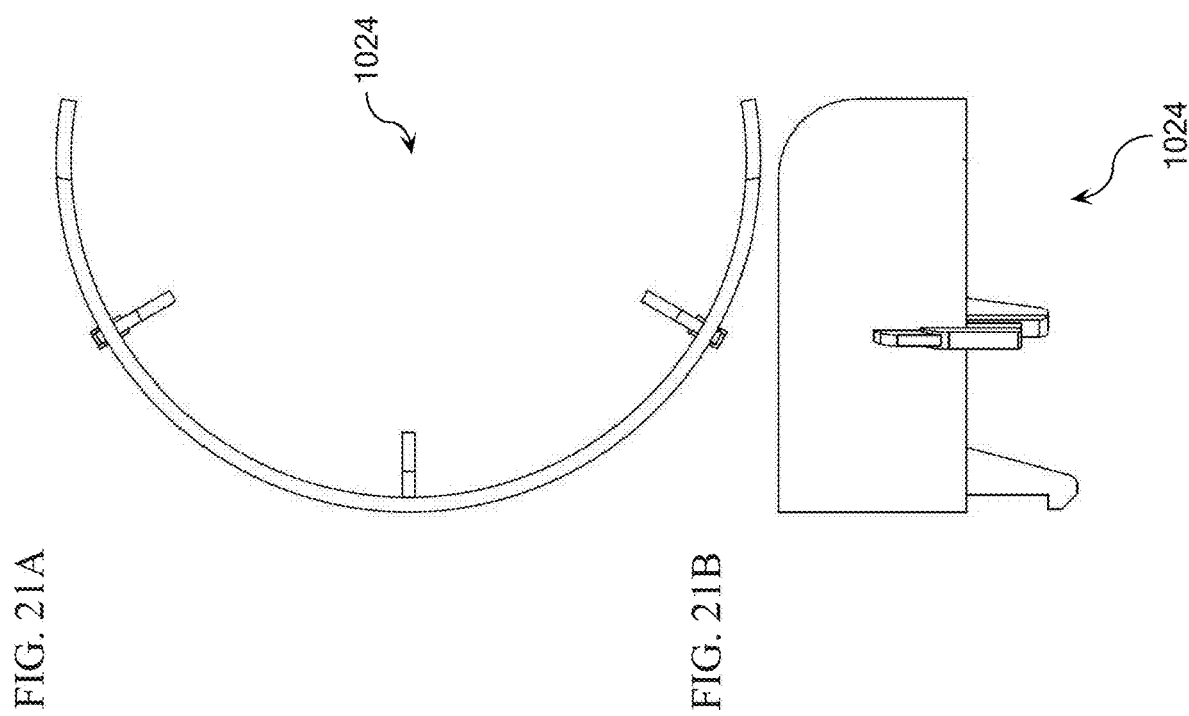

FIGS. 17A-E depict further views of the diffusing head 1020. The diffusing head 1020 is substantially circular and includes the air blade 1022, which may either be an integral part of the diffusing head 1020 or a separate detachable part of the diffusing head 1020. Moreover, the diffusing head 1020 may include a center disk 1024, an air fin 1026, and one or more support legs 1028. The air fin 1026, which may be formed from multiple pieces or a single element, is designed to create a uniform and omnidirectional flow of air from the supply duct to the interior of the RV, via the diffusing head 1020. The collar 1015, air blade 1022, and diffuser vanes 1026, 1028 also cooperate to obstruct the view of any unsightly portions of the duct work or vent assembly from the interior of the vehicle. Moreover, due to its ability to rotate freely within the diffuser base 1010, the diffusing head 1020 allows a user to direct the airflow. In many embodiments, the air blade 1022 is most effective at distributing air through the diffusing head 1020 when it is oriented against the direction of the airflow in the supply duct, as is illustrated in FIG. 9. As shown in FIGS. 9 and 17A, the shape of the diffusing assembly 1000 and the air blade 1022 are capable of producing omnidirectional airflow 1050, which allows the air to run along the ceiling board 1040. The omnidirectional air then gradually falls as it diffuses into the interior of the RV in a uniform fashion. In some embodiments, the omnidirectional air flow 1050 may extend along the ceiling board 1040 for about 2 feet before it starts to fall into the interior of the RV.

The air blade 1022 further gives a user the ability to adjust the amount of air flowing from the AC unit into the interior of the RV by rotating the diffusing head 1020 to a desired configuration. The diffusing head 1020 further includes locking tabs 1021 (see FIGS. 17B and 17D) that are configured to attach the diffusing head 1020 to the diffuser base 1010.

In FIGS. 12 and 13, only an extended portion of the air blade 1022 is visible in the supply duct 1030. This extended portion is an integral part of the diffusing head 1020 and, as is noted above, the air blade rotates with the rest of the diffusing head 1020. It is contemplated, however, that the extended portion of the diffusing head 1020 may be provided as a separate piece, which would be securable to the remainder of the diffusing head 1020 to rotate therewith. For example, referring to FIGS. 18A-C, 19A-C, 20A-C, and 21A-C, a variety of separate extended air blade portions 1024 are illustrated. These extended air blade portions 1024 are configured for convenient snap-fit engagement with the remainder of the diffusing head, although a variety of alternative means of engagement and securement are contemplated.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially," "about" and "approximately" are utilized herein to represent the inherent degree of uncertainty that may be attributed to any quantitative comparison, value, measurement, or other representation. The terms "substantially," "about" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A recreational vehicle comprising a supply duct assembly, the supply duct assembly comprising a conditioned air receiving sleeve, a tapered duct connector, and a supply duct, wherein:
    the conditioned air receiving sleeve is positioned in an infra-ceiling space of the recreational vehicle;
    the conditioned air receiving sleeve further comprises a conditioned air opening occupying at least a portion of a top side of the conditioned air receiving sleeve, lateral sleeve walls defining a sleeve height $h_S$, a conditioned air passage occupying a lateral sleeve wall of the conditioned air receiving sleeve, and a return air opening occupying at least a portion of a bottom side of the conditioned air receiving sleeve;
    the tapered duct connector comprises a connector inlet coupled to the conditioned air passage on the lateral sleeve wall of the conditioned air receiving sleeve and a connector outlet coupled to the supply duct, to fluidly couple the conditioned air receiving sleeve to the supply duct;
    the connector inlet and the connector outlet of the tapered duct connector are directionally offset;
    the tapered duct connector comprises a transitional duct width that decreases from the connector outlet to the connector inlet and a transitional duct height that increases from the connector outlet to the connector inlet;
    the respective magnitudes of decreasing transitional duct width and increasing transitional duct height are such that the connector inlet comprises a cross-sectional flow area that is at least approximately 20% larger than a cross-sectional flow area of the connector outlet; and
    the conditioned air receiving sleeve, the tapered duct connector, and the supply duct contain a conditioned air passage that extends from the conditioned air opening of the conditioned air receiving sleeve, through the conditioned air receiving sleeve and the tapered duct connector, and into the supply duct.

2. The recreational vehicle as claimed in claim 1 wherein:
    the supply duct assembly further comprises a sleeve insert;
    the sleeve insert comprises an insert portion sized to extend through the connector inlet and frictionally engage an inside periphery of the tapered duct connector; and
    the sleeve insert further comprises a flange portion that is sized to abut a framed portion of the conditioned air passage on the lateral sleeve wall of the conditioned air receiving sleeve to provide for securement of the sleeve insert to the conditioned air receiving sleeve along the framed portion of the conditioned air passage with the insert portion extending through the connector inlet of the tapered duct connector.

3. The recreational vehicle as claimed in claim 2 wherein the sleeve insert comprises an internal flow directing vane.

4. The recreational vehicle as claimed in claim 2 wherein the sleeve insert comprises an internal turning vane that extends from the flange portion of the sleeve insert and curves beyond the insert portion of the sleeve insert.

5. The recreational vehicle as claimed in claim 1 wherein:
    the supply duct defines a supply duct height $h_D$; and
    the sleeve height $h_S$ is at least 1.5 times larger than the supply duct height $h_D$.

6. The recreational vehicle as claimed in claim 1 wherein the conditioned air receiving sleeve comprises a six-sided rectangular cuboid where the conditioned air opening and the return air opening form opposite sides of the rectangular cuboid.

7. The recreational vehicle as claimed in claim 1 wherein:
    two opposing conditioned air passages occupy opposing lateral sleeve walls of the conditioned air receiving sleeve; and
    the recreational vehicle comprises a longitudinal dimension extending parallel to the sides of the recreational vehicle and the two opposing conditioned air passages face opposite sides of the recreational vehicle.

8. The recreational vehicle as claimed in claim 1 wherein the connector inlet and the connector outlet of the tapered duct connector are directionally offset between approximately 45 degrees and approximately 90 degrees.

9. The recreational vehicle as claimed in claim 1 wherein the connector inlet comprises a cross-sectional flow area that is between approximately 20% and approximately 40% larger than a cross-sectional flow area of the connector outlet, to optimize mass flow transfer from the conditioned air receiving sleeve to the supply duct without undue turbulence.

10. The recreational vehicle as claimed in claim 1 wherein the transitional duct height of the tapered duct connector increases by a factor of at least about 1.25.

11. The recreational vehicle as claimed in claim 10 wherein an average slope representing a net increase in the transitional duct height of the connector from the connector outlet to the connector inlet is between about 0.05 and about 0.10.

12. The recreational vehicle as claimed in claim 11 wherein the connector inlet comprises a cross-sectional flow area that is between approximately 20% and approximately 40% larger than a cross-sectional flow area of the connector outlet.

13. The recreational vehicle as claimed in claim 1 wherein the tapered duct connector is an elbow connector comprising a single connector inlet and a single connector outlet, or a Y-shaped connector comprising a single connector inlet and two connector outlets.

14. The recreational vehicle as claimed in claim 13 wherein the tapered duct connector is an elbow connector comprising a single connector inlet and a single connector outlet.

15. The recreational vehicle as claimed in claim 13 wherein the tapered duct connector is a Y-shaped connector comprising a single connector inlet and two connector outlets.

16. The recreational vehicle as claimed in claim 1 wherein the tapered duct connector is a linear connector, an elbow connector, or a Y-shaped connector.

17. The recreational vehicle as claimed in claim 1 wherein:
   the recreational vehicle further comprises a roof-mounted AC unit and a ceiling-mounted return air assembly; and
   the roof-mounted AC unit and the ceiling-mounted return air assembly enclose opposite sides of the conditioned air receiving sleeve, with the roof-mounted AC unit over the conditioned air opening of the conditioned air receiving sleeve and the return air assembly over the return air opening of the conditioned air receiving sleeve.

18. A recreational vehicle comprising a supply duct assembly, the supply duct assembly comprising a conditioned air receiving sleeve, a sleeve insert, a tapered duct connector, and a supply duct, wherein:
   the conditioned air receiving sleeve is positioned in an infra-ceiling space of the recreational vehicle;
   the conditioned air receiving sleeve further comprises a conditioned air opening occupying at least a portion of a top side of the conditioned air receiving sleeve, lateral sleeve walls defining a sleeve height $h_S$, a conditioned air passage occupying a lateral sleeve wall of the conditioned air receiving sleeve, and a return air opening occupying at least a portion of a bottom side of the conditioned air receiving sleeve;
   the tapered duct connector comprises a connector inlet and a connector outlet coupled to the supply duct;
   the sleeve insert comprises an insert portion sized to extend through the connector inlet and frictionally engage an inside periphery of the tapered duct connector;
   the tapered duct connector comprises a transitional duct height that increases by a factor of at least about 1.25 from the connector outlet to the connector inlet;
   the tapered duct connector comprises a transitional duct width that decreases from the connector outlet to the connector inlet and a transitional duct height that increases from the connector outlet to the connector inlet; and
   the respective magnitudes of decreasing transitional duct width and increasing transitional duct height are such that the connector inlet comprises a cross-sectional flow area that is at least approximately 20% larger than a cross-sectional flow area of the connector outlet.

\* \* \* \* \*